(12) United States Patent
Carlini et al.

(10) Patent No.: US 8,287,637 B2
(45) Date of Patent: *Oct. 16, 2012

(54) SILICA ENCAPSULATED ORGANIC NANOPIGMENTS AND METHOD OF MAKING SAME

(75) Inventors: Rina Carlini, Oakville (CA); Michelle N. Chretien, Mississauga (CA); Sandra J. Gardner, Oakville (CA)

(73) Assignee: Xerox Corporation, Norwalk, CT (US)

( * ) Notice: Subject to any disclaimer, the term of this patent is extended or adjusted under 35 U.S.C. 154(b) by 203 days.

This patent is subject to a terminal disclaimer.

(21) Appl. No.: 12/411,092

(22) Filed: Mar. 25, 2009

(65) Prior Publication Data
US 2009/0246674 A1 Oct. 1, 2009

Related U.S. Application Data

(60) Provisional application No. 61/039,232, filed on Mar. 25, 2008.

(51) Int. Cl.
*C04B 14/04* (2006.01)
*C09D 11/00* (2006.01)
*G03G 9/00* (2006.01)

(52) U.S. Cl. ........ 106/481; 106/31.77; 106/495; 106/491; 427/212; 427/214; 430/110.2; 430/119.1; 523/200

(58) Field of Classification Search .......... 524/90, 524/441, 495, 93, 190; 523/122, 200, 201; 106/31.77, 495–496, 491, 481; 427/212, 427/214; 430/110.2, 119.1
See application file for complete search history.

(56) References Cited

U.S. PATENT DOCUMENTS

| | | | |
|---|---|---|---|
| 5,104,583 A * | 4/1992 | Richardson | 252/519.33 |
| 5,384,222 A | 1/1995 | Normandin et al. | |
| 5,679,138 A | 10/1997 | Bishop et al. | |
| 5,773,545 A | 6/1998 | Schade et al. | |
| 6,472,523 B1 | 10/2002 | Banning et al. | |
| 6,476,219 B1 | 11/2002 | Duff et al. | |
| 6,506,245 B1 * | 1/2003 | Kinney et al. | 106/412 |
| 6,649,138 B2 * | 11/2003 | Adams et al. | 423/403 |
| 7,008,977 B2 | 3/2006 | Sakai et al. | |
| 7,427,323 B1 | 9/2008 | Birau et al. | |
| 7,427,324 B1 * | 9/2008 | Birau et al. | 106/497 |
| 7,465,348 B1 * | 12/2008 | Carlini et al. | 106/496 |
| 7,465,349 B1 | 12/2008 | Carlini et al. | |
| 7,470,320 B1 * | 12/2008 | Allen et al. | 106/496 |
| 7,473,310 B2 * | 1/2009 | Carlini et al. | 106/496 |
| 7,503,973 B1 | 3/2009 | Carlini | |
| 2004/0266907 A1 * | 12/2004 | Sugita et al. | 523/160 |
| 2005/0109240 A1 | 5/2005 | Maeta et al. | |
| 2007/0012221 A1 | 1/2007 | Maeta et al. | |
| 2007/0224345 A1 * | 9/2007 | Metz et al. | 427/212 |
| 2008/0233509 A1 | 9/2008 | Keoshkerian et al. | |
| 2008/0302269 A1 * | 12/2008 | Carlini et al. | 106/31.25 |
| 2008/0302271 A1 * | 12/2008 | Carlini et al. | 106/31.61 |
| 2008/0302272 A1 * | 12/2008 | Allen et al. | 106/31.77 |
| 2008/0302275 A1 * | 12/2008 | Allen et al. | 106/402 |
| 2009/0226835 A1 * | 9/2009 | Mayo et al. | 430/108.21 |

FOREIGN PATENT DOCUMENTS

| | | |
|---|---|---|
| JP | A-2007-023168 | 2/2007 |
| JP | A-2007-023169 | 2/2007 |
| WO | WO 2006/132443 | 12/2006 |

OTHER PUBLICATIONS

International Preliminary Report on Patentability (IPRP) (Chapter I) mailed Jul. 6, 2009 issued in International Application No. PCT/US2009/038273.
M.R. Bohmer et al., "Incorporation of Pigments in TEOS Derived Matrices," *J. Sol-Gel Sci. & Techn.*, vol. 19, pp. 361-364 (2000).
Philippe Bugnon, "Surface Treatment fo Pigments. Treatment With Inorganic Materials," *Progress in Organic Coatings*, vol. 29, pp. 39-43 (1996).
Frank Caruso et al., "Microencapsulation of Uncharged Low Molecular Weight Organic Materials by Polyelectrolyte Multilayer Self-Assembly," *Langmuir*, vol. 16, pp. 8932-8936 (2000).
Kazuyuki Hayashi et al., "Uniformed nano -downsizing of organic pigments through core-shell structuring," Journal of Materials Chemistry , 17(6), 527-530 (2007).
Hideki Maeta et al., "New Synthetic Method of Organic Pigment Nano Particle by Micro Reactor System," http://aiehe.confex.com/aiche/s06/preliminaryprogram/abstract_40072.htm (date unknown).
Junjie Yuan et al., "Organic Pigment Particles Coated With Titania Via Sol-Gel Process," *J. Phys. Chem. B*, vol. 110, pp. 388-394 (2006).
Junjie Yuan et al., "Encapsulation of Organic Pigment Particles With Silica Via Sol-Gel Process," *J. Sol-Gel Scdi. & Techn.*, vol. 36, pp. 265-274 (2005).
Junjie Yuan et al., "The Properties of Organic Pigment Encapsulated With Nano-Silica Via Layer-by-layer Assembly Technique," *Dyes and Pigments*, vol. 76, pp. 463-469 (2008).
U.S. Appl. No. 12/054,915 to James D. Mayo et al, filed Mar. 25, 2008.
U.S. Appl. No. 12/102,363 to Roger E. Gaynor et al., filed Apr. 14, 2008.
U.S. Appl. No. 12/177,727 to James D. Mayo et al, filed Jul. 22, 2008.
U.S. Appl. No. 12/400,385 to Rina Carlini et al, filed Mar. 9, 2009.
W. Stober et al., "Controlled Growth of Monodisperse Silica Spheres in the Micron Size Range," *J. Colloid Interface Sci.*, vol. 26, pp. 62-69 (1968).

(Continued)

*Primary Examiner* — Vasu Jagannathan
*Assistant Examiner* — Hannah Pak
(74) *Attorney, Agent, or Firm* — Oliff & Berridge, PLC

(57) ABSTRACT

Core-shell nanoscale pigment particles include a core organic pigment composition including nanoscale particles of organic pigments, and a shell layer of surface-deposited silica, where the organic pigment particles are selected from azo-type pigment particles, azo laked pigment particles, quinacridone pigment particles, phthalocyanine pigment particles, and mixtures thereof. The core-shell nanoscale pigment particles can also include an organic primer layer covering the core and located between the core and the shell layer. The core-shell nanoscale pigment particles can be made by preparing a core composition including nanoparticles of organic pigments, and encapsulating the core with shell layer of surface-deposited silica and an optional organic primer layer located between the core and the shell layer.

25 Claims, 3 Drawing Sheets

OTHER PUBLICATIONS

Tsuchida, et al., "Coordination Property of Poly(1-vinyl-2-Methylimidazole)-Heme Complexes," *J. Inorg. Chem.*, v. 17, pp. 283-291 (1982).

Y. Lu et al., "Synthesis and Self-Assembly of Au@$SiO_2$ Core-Shell Colloids," *Nato. Lett.*, vol. 2, pp. 785-788 (2002).

P. Mulvaney et al., "Silica encapsulation of quantum dots and metal clusters," *J. Mater. Chem.*, vol. 10, pp. 1259-1270 (2000).

L. Liz-Marzan et al., "Synthesis of Nanosized Gold-Silica Core-Shell Particles," *Langmuir*, vol. 12, pp. 4329-4335 (1996).

Kim et al., "Encapsulation of Water-Soluble Dye in Spherical Sol-Gel Silica Matrices," *J. Sol-Gel Sci. Tech*, 27, pp. 355-361 (2003).

Widiyandari et al., "Preparation and Characterization of Nanopigment-Poly(styrene-co-η-butyl acrylate-co-methacrylic acid) Composite Particles by High Speed Homogenization-Assisted Suspension Polymerization," *J. App. Polym. Sci.*, 108, pp. 1288-1297 (2008).

M. Darbandi et al., "Single Quantum Dots in Silica Spheres by Microemulsion Synthesis," *Chem. Mater.*, vol. 17, pp. 5720-5725 (2005).

C. Graf et al., "A General Method to Coat Colloidal Particles with Silica," *Langmuir*, vol. 19, pp. 6693-6700 (2003).

Canadian Office Action dated Nov. 10, 2011 in Canadian Patent Application No. 2,718,927.

Canadian Office Action dated Jul. 12, 2012 from Canadian Patent Application No. 2,718,927.

* cited by examiner

SILICA ENCAPSULATED ORGANIC NANOPIGMENTS AND METHOD OF MAKING SAME

This application is a non-provisional application of U.S. provisional application No. 61/039,232, filed Mar. 25, 2008, the entire disclosure of which is incorporated herein by reference.

TECHNICAL FIELD

This disclosure is generally directed to core-shell type, silica encapsulated organic nanopigments, and methods for producing such core-shell type, silica encapsulated organic nanopigments. Such particles are useful, for example, as nanoscopic colorants for such compositions as inks, toners, paints, coatings and the like.

CROSS-REFERENCE TO RELATED APPLICATIONS

Disclosed in U.S. Pat. No. 7,465,348 to Rina Carlini et al. is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed in U.S. Pat. No. 7,465,349 to Rina Carlini et al. is a process for preparing nanoscale-sized monoazo laked pigment particles, comprising: preparing a first reaction mixture comprising; (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed in U.S. Pat. No. 7,465,349 is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

Disclosed in U.S. Pat. No. 7,427,323 to Maria Birau et al, is a nanoscale pigment particle composition, comprising: a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles. Also disclosed in U.S. Pat. No. 7,427,324 is a process for preparing nanoscale quinacridone pigment particles, comprising: preparing a first solution comprising: (a) a crude quinacridone pigment or pigment precursor including at least one functional moiety and (b) a liquid medium; preparing a second solution comprising: (a) a sterically bulky stabilizer compound having one or more functional groups that associate non-covalently with the pigment functional moiety, and (b) a liquid medium; combining the first solution into the second solution to form a third reaction mixture which forms a quinacridone pigment composition of nanoscale particle size and wherein the functional moiety associates non-covalently with the functional group. Further disclosed in U.S. Pat. No. 7,427,324 is a process for preparing nanoscale quinacridone pigment particles, comprising: preparing a first solution comprising a quinacridone pigment including at least one functional moiety in an acid; preparing a second solution comprising an liquid medium and a sterically bulky stabilizer compound having one or more functional groups that associate non-covalently with the functional moiety of the pigment; treating the second solution with the first solution to precipitate quinacridone pigment of nanoscale particle size, wherein the functional moiety associates non-covalently with the functional group.

Disclosed in U.S. Pat. No. 7,503,973 to Rina Carlini is a nanoscale pigment particle composition, comprising: a benzimidazolone pigment, and a sterically bulky stabilizer compound associated non-covalently with the benzimidazolone pigment; wherein presence of the stabilizer limits an extent of particle growth and aggregation, to afford nanoscale-sized pigment particles. Also disclosed is a process for preparing nanoscale particles of benzimidazolone pigments, comprising: providing one or more organic pigment precursors to a benzimidazolone pigment comprising a benzimidazolone moiety, providing a solution or suspension of a sterically bulky stabilizer compound that associates non-covalently with the benzimidazolone moiety on one of the pigment precursors, and carrying out a chemical coupling reaction to form a benzimidazolone pigment composition comprising nanoscale-sized pigment particles, whereby the pigment precursors are incorporated with the benzimidazolone pigment and one or more functional moieties on the benzimidazolone pigment is non-covalently associated with the steric stabilizer, so as to limit an extent of particle growth and aggregation.

Disclosed in commonly assigned U.S. patent application Ser. No. 12/054,915 to James D. Mayo et al, filed Mar. 25, 2008, are nano-sized phthalocyanine pigment particles, comprising: a phthalocyanine chromogen structure as the main component, and a substituted soluble metal-phthalocyanine dye as a minor component that is associated non-covalently with the phthalocyanine chromogen structure, wherein the presence of one or more sterically bulky substituents on the substituted soluble metal-phthalocyanine dye limits an extent of pigment particle growth and aggregation, to afford nano-sized pigment particles. Also disclosed is a process for preparing nano-sized particles of phthalocyanine pigments, comprising: providing a phthalocyanine chromogen material, providing a solution of a substituted soluble metal-phthalocyanine dye, precursors to a substituted soluble metal-phthalocyanine dye, or a mixture thereof, and causing said substituted soluble metal-phthalocyanine dye molecules to non-covalently associate with the phthalocyanine chromogen material, so as to limit an extent of particle growth and aggregation and result in nanoscale-sized pigment particles.

Disclosed in commonly assigned U.S. patent application Ser. No. 12/177,727 to James D. Mayo et al, filed Jul. 22, 2008, is a process for preparing nanoscale pigment particles of phthalocyanine pigments, comprising: providing a unsubstituted phthalocyanine chromogen material and a substituted phthalocyanine chromogen material, reacting the unsubstituted phthalocyanine chromogen material and the substituted phthalocyanine chromogen material to form a mixture of unsubstituted phthalocyanine dye molecules and substituted phthalocyanine dye molecules, and causing said substituted phthalocyanine dye molecules to non-covalently associate with the unsubstituted phthalocyanine dye molecules, so as to limit an extent of particle growth and aggregation and result in nanoscale pigment particles.

Disclosed in commonly assigned U.S. patent application Ser. No. 12/400,385 to Rina Carlini et al, filed Mar. 9, 2009, are encapsulated nanoscale particles of organic pigments, comprising: a polymer-based encapsulating material, and one or more nanoscale organic pigment particles encapsulated by the polymer-based encapsulating material. Also disclosed is a process for preparing polymer encapsulated nanoscale particles of organic pigments, comprising: providing nanoscale organic pigment particles comprised of surface-associated sterically bulky stabilizer compounds; providing a copolymer material comprising organic pigment-affinic functional groups and non pigment affinic monomer units; associating the nanoscale organic pigment particles with the copolymer material so as to effect a deposited layer or shell of the copolymer material around said nanoscale organic pigment particles, thereby producing an encapsulated nanoscale organic pigment particle; and optionally further reinforcing the encapsulated nanoscale organic pigment particle with one or more surface treatments.

Disclosed in commonly assigned U.S. patent application Ser. No. 11/689,739 to Barkev Keoshkerian et al, filed Mar. 22, 2007, is a process of preparing spherical nano-sized core/shell silica particles, comprising providing a latex polymer dispersion comprising particles of a liquid dispersible starting polymer in a dispersion liquid; adding at least one functionalized monomer to the latex polymer dispersion and polymerizing the at least one functionalized monomer on the particles; and growing an outer silicate shell on the particles through addition and reaction of at least one silane monomer. Also disclosed are spherical nano-sized core/shell silica particles formed thereby.

The entire disclosures of the above-mentioned applications are totally incorporated herein by reference.

BACKGROUND

Pigments are a class of colorants useful in a variety of applications such as, for example, paints, plastics and inks, including inkjet printing inks. Dyes have typically been the colorants of choice for inkjet printing inks because they are readily soluble colorants which enable jetting of the ink. Dyes have also offered superior and brilliant color quality with an expansive color gamut for inks, when compared to conventional pigments. However, since dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water-/solvent-fastness). In certain situations, pigments are the better alternative as colorants for inkjet printing inks since they are insoluble and cannot be molecularly dissolved within the ink matrix, and therefore do not experience colorant diffusion. Pigments can also be significantly less expensive than dyes, and so are attractive colorants for use in all printing inks.

Key challenges with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate can vary widely depending on the aggregate size and crystal morphology. Thus, an ideal colorant that is widely applicable in, for example inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost. It is important to point out that the surface interactions of organic pigments with the matrix are mainly responsible for the properties of a pigment, such as thermal stability, photostability, and dispersability, and not just the pigment characteristics such as chromogen, particle size and shape alone. It is therefore advantageous for organic pigment particles to have passivated surface characteristics in order to have enhanced performance in a matrix; that is to say, the particle surface characteristics would have non-reactive components and are chemically inert so that the particles could have greatly enhanced affinity for their intended matrix and avoid undesirable interparticle interactions such as pigment aggregation or agglomeration (which leads to undesirable large particle aggregates that are unsuitable for most inks). Furthermore, it would be particularly advantageous for various ink and paint applications if the pigment particles can be made more thermally stable, particularly when in a dispersed matrix, by way of a chemical and/or physical modification of the pigment surface. Among the many reported approaches to preparing surface-passivated or surface-modified organic pigments, a suitable method would involve creating thermally robust core-shell type pigments through a simple, low-energy, chemical surface modification process. One such design approach is pigment surface encapsulation with inorganic oxides such as silica, which can generally be prepared by a sol-gel type polymerization of a silica precursor reagent, as originally reported by Stöber in *J. Colloid Interface Sci.* 1968, v. 26, p. 62. Although there are many reports that disclose various core-shell type compositions prepared by silica coating or encapsulation of a wide variety of core materials, primarily on inorganic core metals such as metals, metal oxides, semiconducting nanocrystals, and also including organic materials such as polymer latex particles and colorants such as fluorescent dyes and selected pigments, there have not been any reports of such compositions specifically for the nanoscale organic pigment compositions as disclosed herein. Similarly, there are no reports for the use of such core-shell type silica-encapsulated nanoscale organic pigments in applications such as printing inks, inkjet inks, toners, and the like.

Thus, there is a need addressed by embodiments of the present invention, for smaller nanoscale pigment particles that minimize or avoid the problems associated with conventional larger-sized pigment particles. There is also a need to develop nanoscale pigment compositions with suitable and passive surface characteristics that will enable facile dispersability and thermal stability of the pigment particles in a wide variety of matrices. There further remains a need for processes for making and using such improved nanoscale pigment particles as colorant materials. The present core-shell type nanoscale organic pigment particles are useful in, for example, paints, coatings and inks (e.g., inkjet printing inks) and other compositions where pigments can be used such as plastics, optoelectronic imaging components, photographic components, and cosmetics among others.

The following documents provide background information:

Hideki Maeta et al., "New Synthetic Method of Organic Pigment Nano Particle by Micro Reactor System," in an abstract available on at URL address: http://aiche.confex.com/aiche/s06/preliminaryprogram/abstract_40072.htm, which describes a new synthetic method of an organic pigment nanoparticle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

U.S. Patent Application Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

Kazuyuki Hayashi et al., "Uniformed nano-downsizing of organic pigments through core-shell structuring," Journal of Materials Chemistry, 17(6), 527-530 (2007) discloses that mechanical dry milling of organic pigments in the presence of mono-dispersed silica nanoparticles gave core-shell hybrid pigments with uniform size and shape reflecting those of the inorganic particles, in striking contrast to conventional milling as a breakdown process, which results in limited size reduction and wide size distribution. This reported approach is considered an energy-intensive, top-down process that used dry milling to physically adhere individual silica nanoparticles (as opposed to a shell layer) onto organic pigments.

Frank Caruso et al., "Microencapsulation of Uncharged Low Molecular Weight Organic Materials by Polyelectrolyte Multilayer Self-Assembly," *Langmuir*, 2008, 16, 8932-8936, describes treating an uncharged monocrystalline substance with an amphiphilic substance, such as an surfactants, phospholipids, and polyelectrolytes, and subsequently encapsulating the treated materials with an alternating sequence of cationic and anionic polyelectrolytes. The resultant polymer multilayer shell is semipermeable, allowing release of the encapsulated substance.

M. R. Bohmer et al., "Incorporation of Pigments in TEOS Derived Matrices," J. Sol-Gel Sci. & Techn., 19, 361-364 (2000), describes that small organic pigments were incorporated in TEOS derived sol-gel layers on glass. The layers were characterized based on transparency, lightfastness and pencil hardness. The article describes that pigment loaded layers have a better lightfastness than layers into which dyes are incorporated. As only moderate curing temperatures (160° C.) were applied, the organic fraction originating from the organic stabilizer present in the pigment dispersion remains to a large extent in the layer. Therefore the pencil hardness decreases with the amount of stabilizer used to disperse the pigment particles.

Junjie Yuan, "The Properties of Organic Pigment Encapsulated With Nano-Silica Via Layer-by-layer Assembly Technique," Dyes and Pigments, 76, 463-469 (2008), describes an organic pigment coated with nano-silica particles via layer-by-layer self-assembly technique, and some properties thereof. The article describes that the coating of nano-silica on the surfaces of pigments could improve the thermal stability, wettability, acid and alkali resistance, and weatherability of the organic pigment; however there is no specific indication of their approach with nanoscale pigments as substrates.

U.S. Pat. No. 7,008,977 discloses colored fine resin particles having a structure in which a conventional, sub-micron sized pigment particles with diameters of about 500 nm, which are coated with a water-insoluble resin is encapsulated with a copolymer composed of at least a polymerizable unsaturated monomer and reactive emulsifier. Examples provided in the invention provided use dry commercial pigments that were pre-processed with resinous surface additives to aid dispersability in a monomer matrix. In some of the examples, media milling of the commercial dry pigments was necessary to reduce the pigment particle size and thereby enable dispersion and eventual coating with the in situ polymerized monomer. None of the examples described the preparation or use of nanosized particles of organic pigments as a raw material.

In *J. App. Polym. Sci.* 2008, 108, 1288 by Widiyandari et al., is described the preparation of micron-sized, spherical composite particles of pigments and polymers for use in printing inks and toners. In the article is described the use of nanosized phthalocyanine pigment particles that are core-shell particles comprised of silica in the nanoparticle core, and Pigment Blue 15:3 in the shell. The composite polymer/pigment particles are prepared by suspension-polymerization of monomers in the presence of dispersed pigment particles, thereby producing spherical micron-size composite particles ranging in particle diameter of about 4.4 to 7.4 microns. There is no description of the process for making the nanosized particles of Pigment Blue 15:3 in this article, and the final micron-sized core-shell composition has a generously thick pigment shell layer instead of nanoscale pigment as the core.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

In *Langmuir*, 2003, 19, 6693-6700 by Graf, et al. is described a general method for coating inorganic colloidal particles with homogeneous silica shells by a sol-gel polymerization process. The colloidal particles investigated were mainly inorganic materials including gold and silver colloids, clay nanoparticles such as boehmite and gibbsite, as well some polystyrene latex particles, and the general process involved using an amphiphilic and nonionic polymer such as poly(vinyl pyrrolidone) as a particle surface adsorbant to enable direct coating by the silica reagent using sol-gel method and without needing to use a silane coupling agent. There is no discussion of surface coating of organic pigments or pigment nanoparticles with silica by this process.

In *J. Sol-Gel Sci. Tech.* 2003, 27, 355 by Kim, et al. is described a process for making encapsulating water soluble organic dye into silica microspheres using a sol-gel process in an oil/water microemulsion. The microemulsion is formed from sodium silicate in the water phase and organic dye solubilized in cyclohexane as the oil phase, which gave dye encapsulated silica microspheres that had a certain level of porosity which led to leaching of the dye from the core. The pore size of the silica microcapsule was reduced by using a dopant, 3-glycidoxypropyltrimethoxysilane, in the water phase to help reinforce the silica microsphere and minimize dye leaching from the core. The article does not describe any of these compounds as nanoparticles in size, nor of any insoluble organic pigments as the colorant.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 µm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (U); and (F) diluting the mixture from step (E) to obtain an ink jet ink having a pigment concentration suitable for ink jet printers.

Japanese Patent Application Publications Nos. JP 2007023168 and JP 2007023169 discloses providing a pigment dispersion compound excellent in dispersibility and flowability used for the color filter which has high contrast and weatherability. The solution of the organic material, for example, the organic pigment, dissolved in a good solvent under the existence of alkali soluble binder (A) which has an acidic group, and a poor solvent which makes the phase change to the solvent are mixed. The pigment nanoparticles dispersed compound re-decentralized in the organic solvent containing the alkali soluble binder (B) which concentrates the organic pigment nanoparticles which formed the organic pigment as the particles of particle size less than 1 µm, and further has the acidic group.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing methods for producing core-shell type nanoscale pigment particle compositions that are silica encapsulated organic nanopigments.

The core-shell type silica encapsulated organic nanopigments provide a benefit that the silica encapsulation passivates the pigment particle surface functionality, such as surface chemistry and surface potential, so as to enable more uniform particle dispersion characteristics in a given matrix. For example, different types of organic nanopigments can be encapsulated with inorganic oxides such as silica, titania, and the like, so that a standard ink composition can be suitable for such encapsulated nanopigments without requiring a customized reformulation for a particular pigment type, which is most often required. The silica encapsulation of pigment nanoparticles can therefore enable one to have a core-shell type colorant material by merely changing the core colorant composition (pigment) but not the surface shell composition.

In an embodiment, the present disclosure provides core-shell nanoscale pigment particles, comprising:

a core organic pigment composition comprised of nanoscale particles of organic pigments, a shell layer comprised of surface-deposited silica, and an optional organic primer layer covering said core and located between said core and said shell layer, wherein said organic pigment particles are selected from the group consisting of azo-type pigment particles, azo laked pigment particles, quinacridone pigment particles, phthalocyanine pigment particles, and mixtures thereof.

In another embodiment, the present disclosure provides a process for preparing core-shell nanoscale pigment particles, comprising:

preparing a core composition comprising nanoparticles of organic pigments, and encapsulating said core with a shell layer comprised of surface-deposited silica and an optional organic primer layer located between said core and said shell layer, wherein said organic pigment particles are selected from the group consisting of azo-type pigment particles, azo laked pigment particles, quinacridone pigment particles, phthalocyanine pigment particles, and mixtures thereof.

DETAILED DESCRIPTION OF EXEMPLARY EMBODIMENTS

Figure 1:
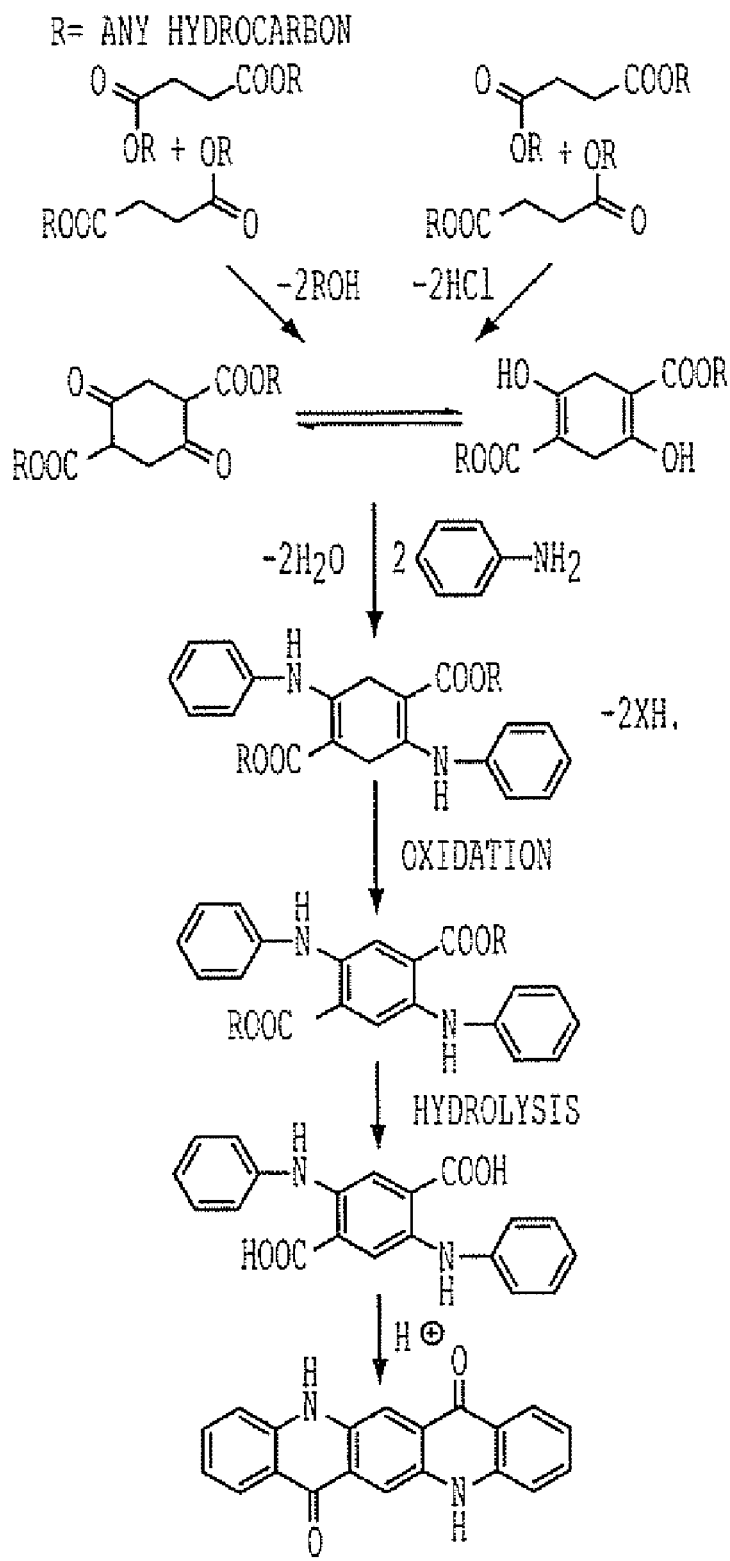
FIGS. 1 and 2 are schematic representations of methods for the total synthesis of quinacridone pigments.

Embodiments of the present disclosure provide core-shell type, silica encapsulated organic nanopigments, and methods for producing such core-shell type, silica encapsulated organic nanopigments. The core-shell type, silica encapsulated organic nanopigment generally comprises a nanoscale organic pigment particle composition, encapsulated in a silica shell. In one embodiment, the nanoscale pigment particle composition generally comprises an organic azo laked pigment that is associated non-covalently with a functional group from a sterically bulky stabilizer compound. The presence of the associated stabilizer during the synthesis of the core organic pigment particles helps to limit the extent of particle growth and aggregation so as to afford nanoscale particles. The presence of the surface silica shell helps to passivate the surface properties and functionality of the core organic pigment nanoparticle, thereby enabling good particle dispersability in a variety of ink carrier compositions. Additionally, the surface deposited silica layer is of nanoscale thickness, and is optically transparent and chemically inert.

The core-shell type, silica encapsulated organic nanopigments of the present disclosure are distinguished from otherwise apparently similar core-shell type, encapsulated larger-sized pigments, by the fact that the present embodiments are directed to nanoscale pigments prepared by 'bottom-up' particle growth processes, rather than larger sized (such as micron-sized) pigment materials or even pigment particles that were mechanically milled down to sub-micron particle sizes. This distinction is important because nanoparticles have higher surface area and require different processing, such as the use of different conditions and/or additives, in order to achieve the desired core-shell compositions while at the same time preventing the growth of the core nanoparticle itself. Furthermore, nanoscale pigments that are prepared by 'bottom-up' particle growth processes involving the controlled assembly of colorant molecules in the presence of non-covalently associated stabilizers and/or surface additives provide nanoparticles with tailored surface chemistry and surface potential that enables facile deposition of shell-type materials such as polymerized silica or titania shell layer. The present disclosure thus provides processes for achieving such objectives, and products formed thereby.

In general, the core-shell type, silica encapsulated organic nanopigments of the present disclosure can comprise any organic nanopigment, that is, a pigment particle in the nanometer-size range having desired particle size and shape characteristics, encapsulated in an optically transparent silica shell of nanometer-scale thickness. Thus, for example, suitable organic nanopigments can include, but are not limited to:

nanoscale pigment particles of an organic azo laked pigment that contains at least one functional moiety, and a sterically bulky stabilizer compound that contains at least one functional group, wherein the functional moiety of the organic pigment associates non-covalently with the functional group of the sterically bulky stabilizer; and the presence of the associated stabilizer limits the extent of particle growth and aggregation, to afford nanoscale-sized pigment particles, such as disclosed in U.S. Pat. No. 7,465,348.

nanoscale pigment particles comprising an organic monoazo laked pigment that contains at least one functional moiety, and a sterically bulky stabilizer compound that contains at least one functional group, wherein the monoazo laked pigment by laking (precipitating) a monoazo dye molecule by treatment with a divalent metal cation; the functional moiety of the organic monoazo laked pigment associates non-covalently with the functional group of the steric stabilizer; and the presence of the associated steric stabilizer limits the extent of particle growth and aggregation, so as to afford nanoscale pigment particles, such as disclosed in U.S. Pat. No. 7,473,310;

nanoscale phthalocyanine-type pigment particles, comprising: a metal-phthalocyanine or metal-free phthalocyanine chromogen structure as the main component, and a substituted soluble metal-phthalocyanine dye as a minor component that is associated non-covalently with the phthalocyanine chromogen structure, wherein the presence of one or more sterically bulky substituents on the substituted soluble metal-phthalocyanine dye limits an extent of pigment particle growth and aggregation, to afford nanoscale pigment particles, such as disclosed in U.S. patent application Ser. No. 12/054,915 filed Mar. 25, 2008; and nanoscale pigment particles comprising a quinacridone pigment that has at least one functional moiety, and a sterically bulky stabilizer compound that has at least one functional group, wherein the functional moiety of the pigment associates non-covalently with the functional group of the steric stabilizer; and the presence of the associated stabilizer limits the extent of particle growth and aggregation, to afford nanoscale-sized particles, such as disclosed in U.S. Pat. No. 7,427,323.

The entire disclosures of these applications are incorporated herein by reference in their entirety. Of course, it will be apparent that the pigment particles are not limited to these particles, and that other organic nanopigments can be used as desired, such as azo-type pigments including monoazo and disazo pigments, azo-naphthols, azo-methine pigments, azo-pyrazolones, diketopyrrolopyrroles, diarylide pigments, perylenes, perinones, anthraquinones, anthrapyrimidines, isoindoline pigments, triarylcarbonium salt pigments, among others. For an exemplary explanation, the following discussion will focus on the nanoscale pigment particles as comprising an organic monoazo laked pigment and a quinacridone class organic pigment, although the disclosure is not limited thereto.

Figure 2:
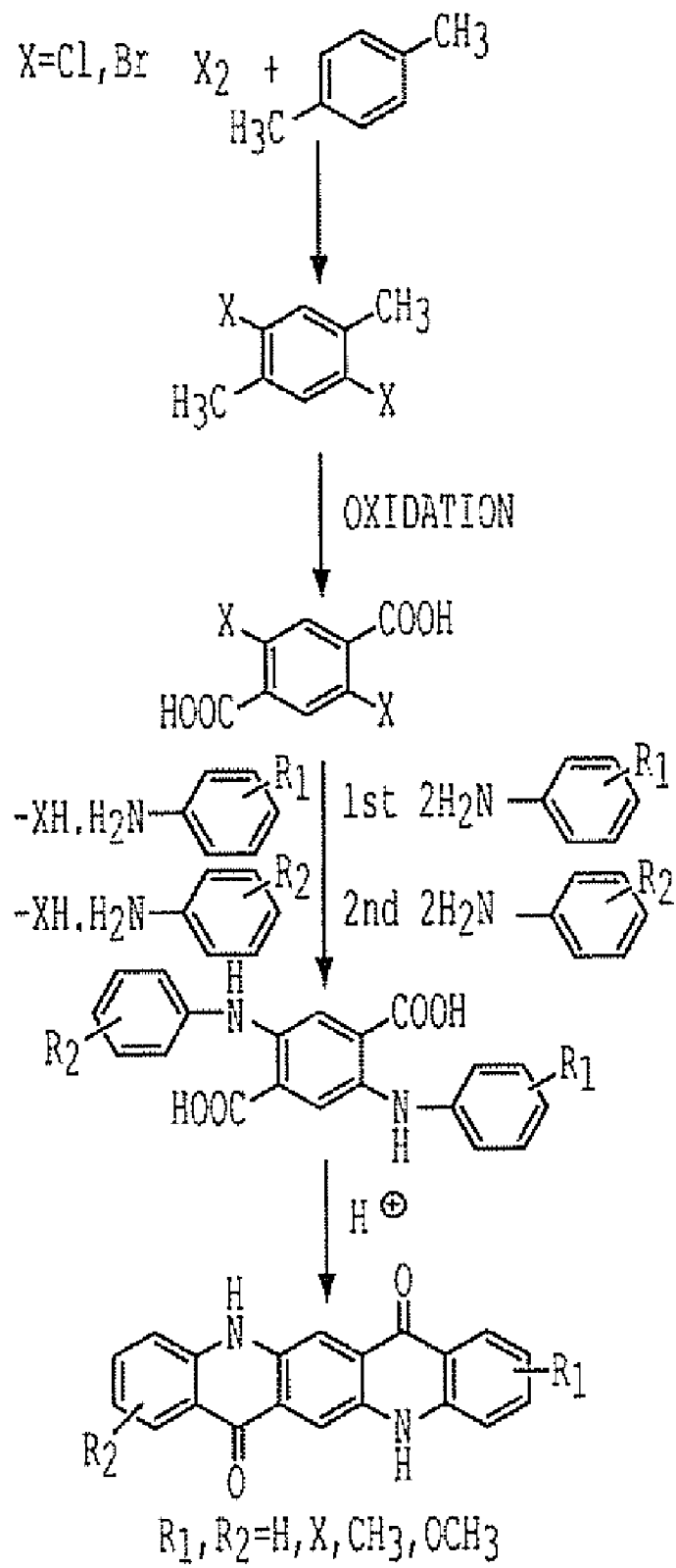

There are several methods reported in literature for the total synthesis of quinacridone pigments, which as described by Herbst and Hunger in *Industrial Organic Pigments*, (Wiley-VCH, 2004), involve known chemical transformations to form the pentacyclic quinacridone skeleton by either a thermally-induced or an acid-catalyzed ring closure, of a 2,5-dianilino terephthalic acid (or diester) pigment precursor, as illustrated in FIGS. 1 and 2. This pigment precursor is in turn prepared from either succinate esters or 2,5-dihalo-terephthalic acid, as the starting raw materials.

Nanoscale particles of quinacridone organic pigment can be prepared in one of two preferred ways: 1) solubilizing crude quinacridone pigment into an acidic liquid (commonly known as "acid pasting") and reprecipitation of the pigment as nanoparticles; and 2) synthesis of nanoscale particles of quinacridone pigment by ring closure of an advanced pigment precursor. In embodiments, nanoscale particles of quinacridone pigment can be prepared by the various methods disclosed in U.S. Pat. No. 7,427,323, U.S. Pat. No. 7,427,324, and U.S. patent application Ser. No. 12/102,363 (Xerox Corporation), which are totally incorporated herein by reference, and involve the solubilization of crude quinacridone pigments, or pigment precursor, into an acidic liquid (a technique commonly known as "acid pasting") followed by reprecipitation of the pigment as nanoparticles or nanocrystals from a quenching non-solvent mixture.

The term "pigment precursor" can be any chemical substance that is an advanced intermediate in the total synthesis of the organic pigment. In embodiments, the organic pigment and the pigment precursor may or may not have the same functional moieties. In embodiments, the pigment precursor may or may not be a colored compound. In embodiments, where the organic pigment and the pigment precursor have a structural feature or characteristic in common, the phrase "organic pigment/pigment precursor" is used for convenience rather than repeating the same discussion for each of the organic pigment and the pigment precursor.

In embodiments of the present disclosure, and as disclosed previously in U.S. patent application Ser. No. 12/102,363 and in U.S. Pat. No. 7,427,323, the disclosures of which are totally incorporated herein by reference, the nanoscale particles of quinacridone pigments contain an associated steric stabilizer compound as a surface additive. The steric stabilizer functions by associating itself non-covalently with the functional moieties of the pigment using various modes including, hydrogen bonding, van Der Waals forces, and aromatic pi-stacking, or combinations thereof, such that during the preparation of the nanoscale pigment particles by the above method in the presence of a suitable steric stabilizer, there is controlled crystallization of organic pigment nanoparticles and limited pigment particle growth, due to the action of the associated stabilizer additives. The stabilizer compound should have a hydrocarbon moiety that provides sufficient steric bulk to enable the function of the stabilizer to regulate pigment particle size. The hydrocarbon moiety in embodiments is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons. The stabilizer should have its hydrocarbon moiety large enough so that as several stabilizer molecules become non-covalently associated with the chemical entity (pigment or precursor), the stabilizer molecules act as surface barrier agents for the primary pigment nanoparticles, and thereby limits the growth of these pigment nanoparticles.

In embodiments, a process is disclosed wherein a steric stabilizer or surface additive compound is first solubilized or dispersed in the acid medium which is optionally heated and/or maintained at a desired temperature, such as from about 0° C. to about 100° C., or preferably between about 20° C. to about 80° C., or most preferably between about 30° C. to about 60° C. The strong acid can be either, for example, a mineral acid, an organic acid, or a mixture thereof. Examples of strong mineral acids, which are preferred in this process, include sulfuric acid, nitric acid, various hydrohalic acids (such as hydrochloric acid, hydrobromic acid, and hydrofluoric acid), fluorosulfonic acid, chlorosulfonic acid, phosphoric acid, polyphosphoric acid, boric acid, mixtures thereof, and the like. Alternatively, examples of strong organic acids include organic sulfonic acid, such as methanesulfonic acid and toluenesulfonic acid, acetic acid, trifluoroacetic acid, chloroacetic acid, cyanoacetic acid, mixtures thereof, and the like. The amount of acid solution can be selected such that after pigment addition, the acid solution contains pigment in a concentration of 0.5% to 20%, such as 1% to 15% or 2% to 10% by weight, although the values can also be outside these ranges.

The steric stabilizer loading in the process can vary between about 1 to about 300 mol %, such as about 10 to about 150 mol % based on pigment moles, or can be loaded between 0.5 to about 75 wt %, such as about 1 to about 30 wt % based on pigment solid weight. The crude quinacridone pigment, or pigment precursor, is then added to the strong acid solution containing the dissolved surface additive. The dissolution or suspending of pigment particles within the strong acid solution can be performed at any desired temperature, such as from about 0° C. to about 100° C., or about 20° C. to about 80° C., or preferably from about 40° C. to about 60° C. In embodiments, the acid medium is heated to a temperature above room temperature, since higher temperature assists in the dissolution of the surface additive as well as the subsequent dissolution of the crude pigment or pigment precursor. Once the pigment material is added to this first acid solution, the solution can be held as desired and stirred for an amount of time to allow suitable and desired mixing or surface adhesion of the pigment particles by the additive.

Any suitable liquid medium can be used to carry out the reprecipitation of the quinacridone pigment in the presence of a polymer-based encapsulant material, so as to afford nanoscale pigment particles that have surface-associated steric stabilizer compounds. Desirably, the reprecipitation can be carried out in deionized water, and optionally in the presence of an organic co-solvent or liquid, and that will not dissolve the pigment nanoparticles nor surface additive. The second solution, in which the reprecipitation is carried out, thus desirably includes deionized water as the major component. Suitable candidates for the optional organic co-solvent include, but are not limited to, short-chain alcohols such as methanol, ethanol, 1-propanol, 2-propanol, 1-butanol, 2-butanol; higher order or branched or cyclic alcohols such as cyclohexanol, ethylene glycol, diethylene glycol, propylene glycol, dipropylene glycol, mono-alkyl ethers of diethylene or dipropylene glycols such as DOWANOL®, and the like; alkyl ethers such as tetrahydrofuran, dimethoxyethane, dimethoxypropane, and the like; polar aprotic solvents such as ethyl acetate, butyl acetate, methoxypropyl acetate, N-methylpyrrolidinone, sulfolane, N,N-dimethylformamide, N,N-dimethylacetamide, and the like; hydrocarbon solvents such as hexanes, toluene, xylenes, Isopar solvents, and mixtures thereof. The optional precipitating agent can also be ammonia solution (concentrated solution or other percentages). The organic cosolvent is optionally added in a range of about 1% to about 90% by volume out of the total volume of the mixture, such as between about 5% and about 50%, or between about 10% and about 30%, although the desired value can also be outside these ranges. The formation of the nanoscale quinacridone pigment particles can be conducted by adding the first strong acid solution containing dissolved pigment and surface additive to this second (re-precipitation) solution under vigorous agitation such as by use of high-speed mechanical stirring or homogenization or other means.

In an alternative process, the steric stabilizer can be dispersed within the reprecipitation solution, either by dissolution or by finely suspending the stabilizer compound in a suitable liquid medium including the organic co-solvents described previously such as acetone, acetonitrile, ethyl acetate, alcohols such as methanol, ethanol, isopropanol, diethyl ether, tetrahydrofuran, N-methyl-2-pyrrolidinone, dimethyl sulfoxide, N,N-dimethylformamide, N,N-dimethylacetamide, sulfolane, ethers of diethylene or dipropylene glycols such as DOWANOL®, or mixtures thereof, and the like. For example, one suitable liquid medium in an embodiment is a mixture of water and N-methyl-2-pyrrolidinone. Such mixtures can contain water and N-methyl-pyrrolidinone in a ratio of 1:6 to 1:3, and preferably around 1:4. The steric stabilizer loading in the process can vary between about 1 to about 300 mol %, such as about 10 to about 150 mol % based on pigment moles, or can be loaded between 0.5 to about 75 wt %, such as about 1 to about 30 wt % based on pigment solid weight.

The pigment reprecipitation process can be conducted at any desired temperature to allow the formation of quinacridone pigment nanoparticles having a surface-associated stabilizer. For example, the reprecipitation can be conducted at a temperature of from about 0° to about 90° C., such as from about 0° to about 50° C., or from about 0° to about 25° C., although temperatures outside of these ranges can be used, if desired. In one embodiment, the reprecipitation can be performed essentially isothermally, where a substantially constant temperature is maintained, while in another embodiment, the temperature during reprecipitation can be allowed to fluctuate within a desired range, where the fluctuation can be cyclic or the like.

Once the reprecipitation is complete, the quenched mixture is strongly acidic and can be neutralized by adding a suitable base to the solution, such as concentrated or aqueous ammonia solution. Other suitable neutralizing agents can include hydroxides, carbonates or bicarbonates of Group 1 or Group 2 metals such as NaOH, KOH, $Na_2CO_3$, $K_2CO_3$, and the like. Once the neutralization is complete, the quinacridone pigment nanoparticles can be separated from the solution by any conventional means, such as for example, vacuum-filtration methods or centrifugal separation methods. The nanoparticles can also be processed for subsequent use according to known methods.

Representative steric stabilizers as surface additives to enable controlled pigment crystallization and formation of nanoscale quinacridone particles include, but are not limited to, the following: a) esters of sorbitol with palmitic acid (SPAN® 40), stearic acid (SPAN® 60) and oleic acid (SPAN® 85) or mixtures thereof, where the aliphatic chain of the acid is at least C10 or higher; b) tartaric acid esters with linear, branched or cyclic alcohols such as cyclohexanol, Isofol 20 (available from Sasol America); c) rosin-based natural compounds and synthetic derivatives, including functional classes such as rosins, rosin esters, rosin acids, rosin salts, or the like, that have the function of coating the pigment particles to limit the extent of pigment particle or molecular self-assembly so as to produce predominantly nanoscale-sized pigment particles. The rosin compounds can be hydrogenated or not for any of the aforementioned classes. Specific examples of commercially available rosin compounds include, for example, hydrogenated rosin esters (such as Pinecrystal KE-100 or KE-311 manufactured by Arakawa Kagaku Co., Ltd.), hydrogenated rosin glycerol esters, levopimaric acid, neoabietic acid, palustric acid, abietic acid, dehydroabietic acid, seco-dehydroabietic acid, tetrahydroabietic acid, dihydroabietic acid, pimaric acid, and isopimaric acid, calcium resonates, sodium resonates, zinc resonates, magnesium resonates, barium resonates, lead resonates, cobalt resonates, mixed resonates (such as calcium and zinc resonates), sodium salts of rosins (such as DRESINATE X™ from Hercules Paper Technology Group), alkyl esters of rosin or hydrogenated rosin (such as HERCOLYN D™, a methyl ester of hydrogenated rosin from Hercules, Inc., and ABALYN™, a methylester of rosin from Hercules, Inc.), mixtures thereof, and the like.

In embodiments, the nanoscale particles of quinacridone pigments, when properly prepared using the exemplary conditions in the presence of steric stabilizers, were desirably ultrafine in particle size. For example, the material desirably has an average particle size of less than about 100 nm, such as about 10 nm to about 20 nm, about 40 nm, about 60 nm, or about 80 nm, measured as an average particle diameter (length) images obtained by Transmission Electron Microscopy (TEM). The shape of the nanosized pigment particles can be one or more of several morphologies, including rods, platelets, needles, prisms or nearly spherical, and the [length: width] aspect ratio of the nanoscale pigment particles can range from 1 to about 10, such as having aspect ratio between 1 and 5; however the actual ratio can also lie outside of these ranges.

A second method of making nanoscale particles of quinacridone pigments involves ring closure of a quinacridone pigment precursor. In this method, the quinacridone pigment composition is synthesized concomitantly with nanoparticle formation, whereby a suitable steric stabilizer compound is introduced at a suitable loading within the final steps of the quinacridone synthesis route shown in FIG. 2 involving an acid-catalyzed ring closure.

An embodiment of the second method discloses the synthesis of quinacridone pigment nanoparticles starting from 2,5-dianilino terephthalic acid or its diester derivative, as illustrated in Formula (1), by way of an acid-catalyzed cyclization in the presence of a steric stabilizer compound. In this particular method, the acid-catalyzed cyclization can be conducted in any suitable acidic liquid medium, such as, for example, in the presence of any of the strong acids as described previously for the first method of making quinacridone pigment nanoparticles. The steric stabilizer is added either directly or as a solution into the acidic reaction mixture. The steric stabilizer loading in the reaction can vary between about 1 to about 300 mol %, such as about 10 to about 150 mol % based on pigment moles, or can be loaded between 0.5 to about 75 wt %, such as about 1 to about 30 wt % based on pigment solid weight. Optionally, the solids concentration of the pigment nanoparticles in the final mixture can vary from 0.5% to 20% by weight such as from 0.5% to about 10% by weight, or 0.5% to about 5% by weight, but the actual value can also be outside these ranges. The functional groups of the steric stabilizer compound associates non-covalently with the functional moieties of the organic pigment/pigment precursor, which thereafter creates a steric barrier surrounding the colorant molecules and/or formed pigment nanoparticles and helps to limit uncontrolled aggregation of the pigment molecules that would normally lead to large pigment particles or aggregates. By these methods, pigment particle size and morphology are controlled and the surface chemistry is tailored for subsequent uses or further surface functionalization, such as core-shell encapsulation with silica. The pigment nanoparticles are separated from the solution by any conventional means, such as for example, vacuum-filtration methods or centrifugal separation methods.

Organic monoazo "laked" pigments are the insoluble metal salt colorants of monoazo colorants which can include monoazo dyes or pigments, and in certain geographic regions these pigments have been referred to as either "toners" or "lakes". The process of ion complexation with a metal salt, or "laking" process, provides decreased solubility of the non-ionic monoazo pigment, which can enhance the migration resistance and thermal stability properties of a monoazo pigment, and thereby enable the applications of such pigments for robust performance, such as colorizing plastics and heat-stable paints for outdoor use. Formula 1 depicts a general representation of monoazo laked pigments, which are ionic compounds that are structurally comprised of a diazo group (denoted $G_d$) and a nucleophilic coupling group (denoted as $G_c$) that are linked together with one azo (N=N) functional group, and a cation ($M^{n+}$) which is typically a metal salt. Either or both of the groups $G_d$ and $G_c$ can contain one or more ionic functional moieties (denoted as FM), such as sulfonate or carboxylate anions or the like.

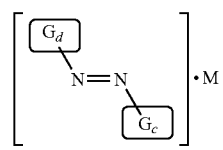

Formula (1)

Figure 3:
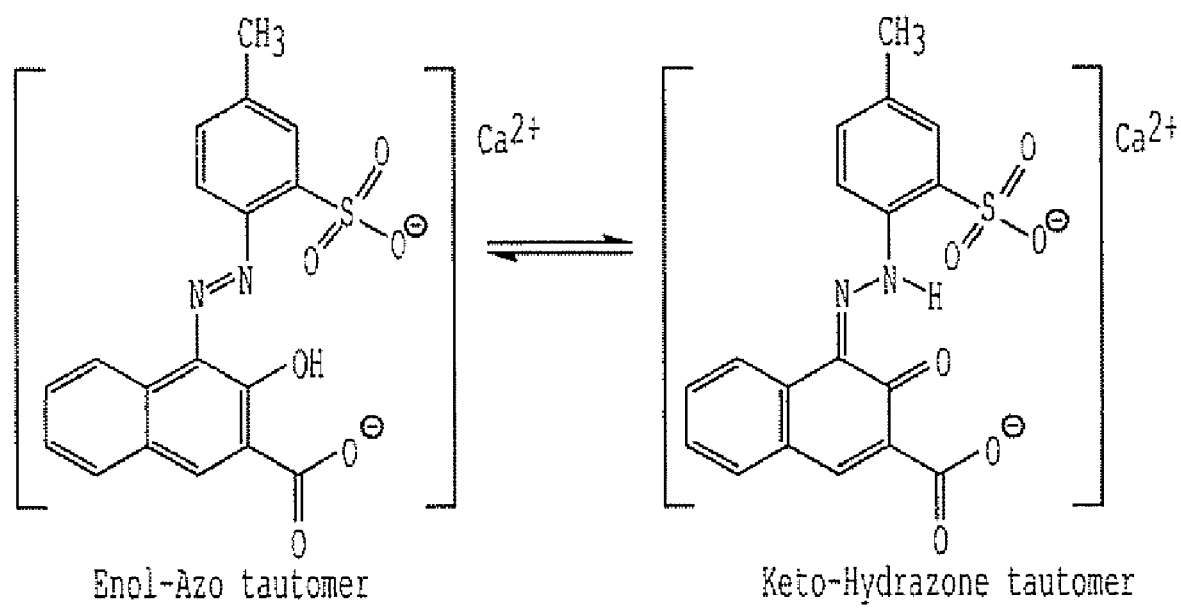
FIG. 3 shows different tautomer forms of the organic pigment PR 57:1.

As an example, the organic pigment PR 57:1 ("PR" refers to Pigment Red) has two different functional moieties, a sulfonate anion group ($SO_3^- M^{n+}$) and carboxylate anion group ($CO_2^- M^{n+}$), wherein $M^{n+}$ represents a divalent countercation such as $Ca^{2+}$ or other divalent metal cation. Further, the azo group in the compounds can generally assume two different tautomer forms as illustrated in FIG. 3 for PR 57:1. The "azo" form which has the (N=N) linkage, while the "hydrazone" form which has the (C=N—NH—) linkage that is stabilized by an intramolecular hydrogen bond, and the hydrazone tautomer is known to be the preferred structural form for PR 57:1. It is provided that formula (1) is understood to denote both such tautomer forms. Due to the structural nature of monoazo laked pigments being ionic salts, it is possible to have compounds that associate non-covalently with the pigment, such as organic or inorganic ionic compounds that can associate with the metal cation through ionic or coordination-type bonds. Such ionic compounds are included in a group of compounds which herein are referred to as "stabilizers", and that function to reduce the surface tension of the pigment particle and neutralize attractive forces between two or more pigment particles or structures, thereby stabilizing the chemical and physical structure of the pigment.

The functional moiety (denoted as FM) of the organic pigment/precursor can be any suitable moiety capable of non-covalent bonding with the complementary functional group of the stabilizer. Illustrative functional moieties of the organic pigment/precursor include (but are not limited to) the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

Pigment precursors for making monoazo laked nanopigments consist of a substituted aniline precursor (denoted as "DC" in Table 1) which forms the diazo group $G_d$ of Formula (1), a nucleophilic or basic coupling compound (denoted as "CC" in Tables 2-6) which leads to the coupling group $G_c$ of Formula (1), and a divalent cation salt which is preferably a metal (denoted as "M" as shown in Formula (1)). Representative examples of the aniline precursor of laked monoazo pigments that have the functional moiety capable of non-covalent bonding with a complementary functional group on the stabilizer, include (but are not limited to) the following structures (with the functional moiety "FM" denoted, if applicable):

In an embodiment, the substituted aniline precursor (DC) which leads to the diazonium group can be of the formula (2):

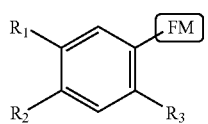

Formula (2)

where $R_1$, $R_2$, and $R_3$ independently represent H, a straight or branched alkyl group of from about 1 to about 10 carbon atoms (such as methyl, ethyl, propyl, butyl, and the like), halogen (such as Cl, Br, I), $NH_2$, $NO_2$, $CO_2H$, $CH_2CH_3$, and the like; and functional moiety FM represents $SO_3H$, —C(=O)—NH-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, —C(=O)—$NH_2$, and the like. The substituted aniline precursor (DC) can be also be Tobias Acid, of the formula (3):

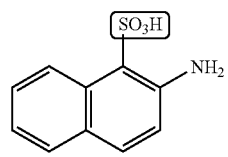

Formula (3)

Specific examples of types of aniline precursors (DC) that are used to make the diazo group $G_d$ in the monoazo laked pigments include those of Table 1:

TABLE 1

| Precursor to Group $G_d$ | Functional Moiety FM | $R_1$ | $R_2$ | $R_3$ |
|---|---|---|---|---|
| DC1 | $SO_3H$ | $CH_3$ | H | $NH_2$ |
| DC2 | $SO_3H$ | $CH_3$ | Cl | $NH_2$ |
| DC3 | $SO_3H$ | Cl | $CH_3$ | $NH_2$ |
| DC4 | $SO_3H$ | Cl | $CO_2H$ | $NH_2$ |
| DC5 | $SO_3H$ | Cl | $CH_2CH_3$ | $NH_2$ |
| DC6 | $SO_3H$ | Cl | Cl | $NH_2$ |
| DC7 | $SO_3H$ | H | $NH_2$ | H |
| DC8 | $SO_3H$ | H | $NH_2$ | $CH_3$ |
| DC9 | $SO_3H$ | $NH_2$ | H | Cl |
| DC10 | $SO_3H$ | H | H | $NH_2$ |
| DC11 | $SO_3H$ | H | $NH_2$ | H |
| DC12 | $SO_3H$ | $NO_2$ | $NH_2$ | H |
| DC13 | —C(=O)—NH—C$_6$H$_4$—SO$_3^-$ | $NH_2$ | $CH_3$ | H |
| DC14 | $CO_2H$ | H | H | $NH_2$ |
| DC15 | Cl | H | H | $NH_2$ |
| DC16 | $NH_2$ | $CH_3$ | H | H |
| DC17 | $NH_2$ | H | $CH_3$ | H |
| DC18 | —C(=O)—$NH_2$ | $NH_2$ | $CH_3$ | H |
| DC19 | —C(=O)—$NH_2$ | H | $NH_2$ | H |
| DC20 | $NH_2$ | H | H | H |
| DC21 | 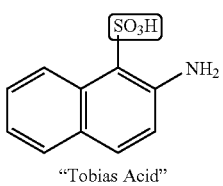 "Tobias Acid" | | | |

In an embodiment, the coupling group $G_c$ of Formula (1) can include β-naphthol and derivatives of Formula (4), naphthalene sulfonic acid derivatives of Formulas (5) and (6), pyrazolone derivatives of Formula (7), acetoacetic arylide derivatives of Formula (8), and the like. In formulas (4)-(8), the asterisk "*" denotes the point of coupling or attachment to the monoazo (N=N) linkage.

Formula (4)

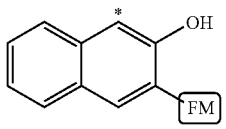

where FM represents H, CO$_2$H, SO$_3$H, —C(=O)—NH-Aryl-SO$_3^-$ where the aryl group can be unsubstituted or substituted with either halogens (such as Cl, Br, I, F) or alkyl groups having from about 1 to about 10 carbons (such as methyl, ethyl, propyl, butyl and the like) CO$_2$H, halogen (such as Cl, Br, I), NH$_2$, —C(=O)—NH$_2$, substituted benzamides such as:

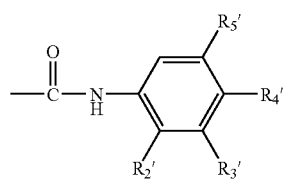

wherein groups R$_2$', R$_3$', R$_4$' and R$_5$' can independently be H, alkyl groups having from about 1 to 10 carbons (such as methyl, ethyl, propyl, butyl, and the like), alkoxyl groups (such as OCH$_3$, OCH$_2$CH$_3$, and the like), hydroxyl or halogen (such as Cl, Br, I, F) or nitro NO$_2$.

Formula (5)

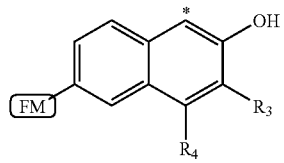

where FM represents preferably SO$_3$H, but also can represent CO$_2$H, —C(=O)—NH-Aryl-SO$_3^-$ where the aryl group can be unsubstituted or substituted with either halogens (such as Cl, Br, I, F) or alkyl groups having from about 1 to about 10 carbons (such as methyl, ethyl, propyl, butyl and the like) CO$_2$H, halogen (such as Cl, Br, I), NH$_2$, —C(=O)—NH$_2$ groups R$_3$ and R$_4$ independently represent H, SO$_3$H, and the like.

Formula (6)

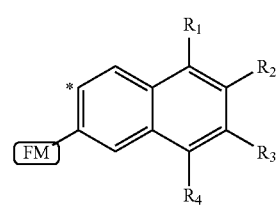

where FM represents preferably SO$_3$H, but also can represent CO$_2$H, —C(=O)—NH-Aryl-SO$_3^-$ where the aryl group can be unsubstituted or substituted with either halogens (such as Cl, Br, I, F) or alkyl groups having from about 1 to about 10 carbons (such as methyl, ethyl, propyl, butyl and the like) CO$_2$H, halogen (such as Cl, Br, I), NH$_2$, —C(=O)—NH$_2$; R$_1$, R$_2$, R$_3$ and R$_4$ independently represent H, SO$_3$H, —C(=O)—NH-Phenyl, and the like.

Formula (7)

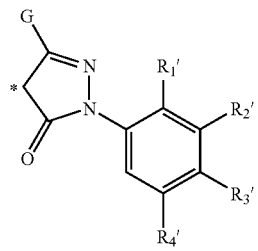

where G represents CO$_2$H, straight or branched alkyl such as having from 1 to about 10 carbons atoms (such as methyl, ethyl, propyl, butyl, or the like), and the like; and R$_1$', R$_2$', R$_3$' and R$_4$' independently represent H, halogen (such as Cl, Br, I), SO$_3$H, nitro (NO$_2$) or alkoxyl group such as OCH$_3$ or OCH$_2$CH$_3$ and the like.

Formula (8)

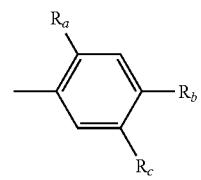

where R$_1$' represents a straight or branched alkyl group having, for example, from 1 to about 10 carbon atoms (such as methyl, ethyl, propyl, butyl, and the like); R$_2$' represents a substituted aryl group where each of R$_a$, R$_b$, and R$_c$ independently represents H, a straight or branched alkyl group having, for example, from 1 to about 10 carbon atoms (such as methyl, ethyl, propyl, butyl, and the like), alkoxyl groups such as OCH$_3$ or OCH$_2$CH$_3$ and the like, halogen (such as Cl, Br, I), nitro NO$_2$, and the like.

Representative examples of the nucleophilic coupling component as a precursor of laked monoazo pigments which have the functional moiety that is capable of non-covalent bonding with a complementary functional group on the stabilizer, include (but are not limited to) the following structures shown in Tables 2-6 (with the functional moiety "FM" denoted, if applicable):

TABLE 2

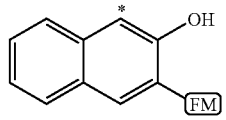

* = point of coupling to diazo component

| Precursor to group $G_c$ | Class of Coupling Component | Functional Moiety FM |
|---|---|---|
| CC1 | β-Naphthol | H |
| CC2 | β-oxynaphthoic acid ("BONA") | $CO_2H$ |
| CC3 | Naphthol AS derivatives | 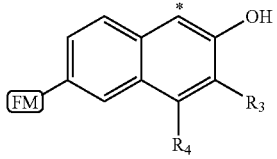 |

TABLE 3

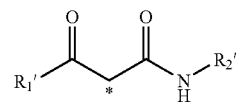

* = point of coupling to diazo component

| Precursor to group $G_c$ | Class of Coupling Component | FM | $R_3$ | $R_4$ |
|---|---|---|---|---|
| CC4a | Naphthalene Sulfonic Acid derivatives | $SO_3H$ | H | H |
| CC4b | Naphthalene Sulfonic Acid derivatives | $SO_3H$ | $SO_3H$ | H |

TABLE 4

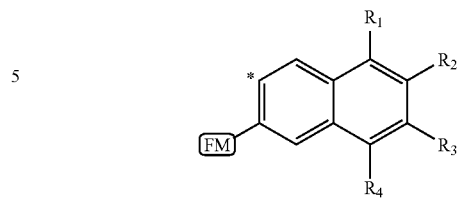

* = point of coupling to diazo component

| Precursor to group $G_c$ | Class of Coupling Component | FM | $R_1$ | $R_2$ | $R_3$ | $R_4$ |
|---|---|---|---|---|---|---|
| CC5 | Naphthalene Sulfonic Acid derivatives | $SO_3H$ | ―C(=O)―NH―Ph | H | H | $SO_3H$ |

TABLE 5

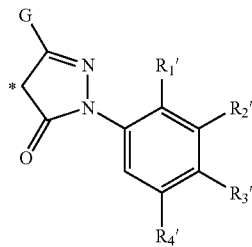

* = point of coupling to diazo component

| Precursor to group $G_c$ | Class of Coupling Component | G | $R_1'$ | $R_2'$ | $R_3'$ | $R_4'$ |
|---|---|---|---|---|---|---|
| CC7 | Pyrazolone deriv. | $CO_2H$ | H | H | $SO_3H$ | H |
| CC8 | Pyrazolone deriv. | $CH_3$ | H | H | $SO_3H$ | H |
| CC9 | Pyrazolone deriv. | $CH_3$ | H | $SO_3H$ | H | H |
| CC10 | Pyrazolone deriv. | $CH_3$ | Cl | H | $SO_3H$ | Cl |

TABLE 6

* = point of coupling to diazo component

| Precursor to group $G_c$ | Class of Coupling Component | $R_1'$ | $R_2'$ | $R_a$ | $R_b$ | $R_c$ |
|---|---|---|---|---|---|---|
| CC11 | Acetoacetic arylide | $CH_3$ | (aryl with $R_a$, $R_b$, $R_c$) | H | H | H |

TABLE 6-continued

R₁'—C(=O)—CH(*)—C(=O)—N(H)—R₂'

\* = point of coupling to diazo component

| Precursor to group $G_c$ | Class of Coupling Component | $R_1'$ | $R_2'$ | $R_a$ | $R_b$ | $R_c$ |
|---|---|---|---|---|---|---|
| CC12 | Acetoacetic arylide | $CH_3$ | (phenyl with $R_a$, $R_b$, $R_c$) | $CH_3$ | H | H |
| CC13 | Acetoacetic arylide | $CH_3$ | (phenyl with $R_a$, $R_b$, $R_c$) | Cl | H | H |
| CC14 | Acetoacetic arylide | $CH_3$ | (phenyl with $R_a$, $R_b$, $R_c$) | H | $OCH_3$ | H |

In embodiments, the counterion M in Formula (1) can be any suitable countercation, and in embodiments is a metal countercation, $M^{n+}$, where M is a metal and n can have any suitable oxidation state such as 1, 2, 3, or 4. According to this disclosure, the monoazo molecules (i.e. the dye precursors) are laked with a metal cation, such as a divalent metal cation, or a mixture of monoazo laked molecules are provided where some of the monoazo molecules are laked with different metal cations. In particular, it has been found that selection of particular metal cations for laking the monoazo molecules, in combination with use of the sterically bulky stabilizer compound for producing the nanoscale pigment particles, allows for specific color selection of the nanoscale pigment particles. This color selection can be further enhanced by using combinations of monoazo molecules that are laked with combinations of two or more different cations.

The organic pigment can include a counterion as part of the overall structure. Such counterions can be, for example, cations or anions of either metals or non-metals that include N, P, S and the like, or carbon-based cations or anions. Examples of suitable metal cations include ions of Ba, Ca, Cu, Mg, Sr, Li, Na, K, Cs, Mn, Cu, Cr, Fe, Ti, Ni, Co, Zn, V, B, Al, Ga, and other metal ions. Examples of non-metal based counter-cations include ammonium and phosphonium cations, mono-, di-, tri-, and tetra-substituted ammonium and phosphonium cations, where the substituents can be aliphatic alkyl groups, such as methyl, ethyl, butyl, stearyl and the like, as well as aryl groups such as phenyl or benzyl and the like.

Representative examples of monoazo laked pigments comprised from a selection of substituted aniline precursors (denoted DC) which can also include Tobias Acid, nucleophilic coupling component (denoted as CC) and metal salts (denoted as M) to provide the counter-cation $M^{n+}$ of formula (1) are listed in Table 7, and other laked pigment structures may arise from other combinations of DC and CC and metal cation salt (M) that are not shown in Table 7.

TABLE 7

$$\left[ G_d-N=N-G_c \right] \cdot M$$

| Color Index # (C.I.) | Color Index (C.I.) Name | Laked Pigment Class | $G_d$ precursor | $G_c$ precursor | Metal Salt M |
|---|---|---|---|---|---|
| 15500:1 | Red 50:1 | β-Naphthol Lakes | DC14 | CC1 | ½ Ba |
| 15510:1 | Orange 17 | β-Naphthol Lakes | DC7 | CC1 | Ba |
| 15510:2 | Orange 17:1 | β-Naphthol Lakes | DC7 | CC1 | ⅔ Al |
| 15525 | Red 68 | β-Naphthol Lakes | DC4 | CC1 | 2 Ca |
| 15580 | Red 51 | β-Naphthol Lakes | DC8 | CC1 | Ba |

TABLE 7-continued

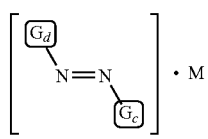

| Color Index # (C.I.) | Color Index (C.I.) Name | Laked Pigment Class | $G_d$ precursor | $G_c$ precursor | Metal Salt M |
|---|---|---|---|---|---|
| 15585 | Red 53 | β-Naphthol Lakes | DC3 | CC1 | 2 Na |
| 15585:1 | Red 53:1 | β-Naphthol Lakes | DC3 | CC1 | Ba |
| 15585:3 | Red 53:3 | β-Naphthol Lakes | DC3 | CC1 | Sr |
| 15602 | Orange 46 | β-Naphthol Lakes | DC5 | CC1 | Ba |
| 15630 | Red 49 | β-Naphthol Lakes | DC21 | CC1 | 2 Na |
| 15630:1 | Red 49:1 | β-Naphthol Lakes | DC21 | CC1 | Ba |
| 15630:2 | Red 49:2 | β-Naphthol Lakes | DC21 | CC1 | Ca |
| 15630:3 | Red 49:3 | β-Naphthol Lakes | DC21 | CC1 | Sr |
| 15800 | Red 64 | β-oxynaphthoic acid (BONA) Lakes | DC20 | CC2 | ½ Ba |
| 15800:1 | Red 64:1 | β-oxynaphthoic acid (BONA) Lakes | DC20 | CC2 | ½ Ca |
| 15800:2 | Brown 5 | β-oxynaphthoic acid (BONA) Lakes | DC20 | CC2 | ½ Cu |
| 15825:2 | Red 58:2 | β-oxynaphthoic acid (BONA) Lakes | DC9 | CC2 | Ca |
| 15825:4 | Red 58:4 | β-oxynaphthoic acid (BONA) Lakes | DC9 | CC2 | Mn |
| 15850:1 | Red 57:1 | β-oxynaphthoic acid (BONA) Lakes | DC1 | CC2 | Ca |
| 15860:1 | Red 52:1 | β-oxynaphthoic acid (BONA) Lakes | DC3 | CC2 | Ca |
| 15860:2 | Red 52:2 | β-oxynaphthoic acid (BONA) Lakes | DC3 | CC2 | Mn |
| 15865:1 | Red 48:1 | β-oxynaphthoic acid (BONA) Lakes | DC2 | CC2 | Ba |
| 15865:2 | Red 48:2 | β-oxynaphthoic acid (BONA) Lakes | DC2 | CC2 | Ca |
| 15865:3 | Red 48:3 | β-oxynaphthoic acid (BONA) Lakes | DC2 | CC2 | Sr |
| 15865:4 | Red 48:4 | β-oxynaphthoic acid (BONA) Lakes | DC2 | CC2 | Mn |
| 15865:5 | Red 48:5 | β-oxynaphthoic acid (BONA) Lakes | DC2 | CC2 | Mg |
| 15867 | Red 200 | β-oxynaphthoic acid (BONA) Lakes | DC5 | CC2 | Ca |
| 15880:1 | Red 63:1 | β-oxynaphthoic acid (BONA) Lakes | DC21 | CC2 | Ca |
| 15880:2 | Red 63:2 | β-oxynaphthoic acid (BONA) Lakes | DC21 | CC2 | Mn |
| 15892 | Red 151 | Naphthol AS Lakes | DC10 | CC3 ($R_2'$ = H, $R_4'$ = $SO_3H$) | Ba |
| 15910 | Red 243 | Naphthol AS Lakes | DC2 | CC3 ($R_2'$ = $OCH_3$, $R_4'$ = H) | ½ Ba |
| 15915 | Red 247 | Naphthol AS Lakes | DC13 | CC3 ($R_2'$ = H, $R_4'$ = $OCH_3$) | Ca |
| 15985:1 | Yellow 104 | Naphthalene Sulfonic Acid Lakes | DC7 | CC4a | ⅔ Al |
| 15990 | Orange 19 | Naphthalene Sulfonic Acid Lakes | DC15 | CC4a | ½ Ba |
| 16105 | Red 60 | Naphthalene Sulfonic Acid Lakes | DC14 | CC4b | ³⁄₂ Ba |
| 18000:1 | Red 66 | Naphthalene Sulfonic Acid Lakes | DC16 | CC5 | ½ Ba, Na |

The complementary functional group of the stabilizer can be one or more of any suitable moiety capable of non-covalent bonding with the functional moiety of the stabilizer. Illustrative complementary functional groups on the stabilizer include the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

The stabilizer can be any compound that has the function of limiting the extent of pigment particle or molecular self-assembly so as to produce predominantly nanoscale-sized pigment particles. The stabilizer compound should have a hydrocarbon moiety that provides sufficient steric bulk to enable the function of the stabilizer to regulate pigment particle size. The hydrocarbon moiety in embodiments is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons.

It is understood that the term "steric bulk" is a relative term, based on comparison with the size of the pigment or pigment precursor to which it becomes non-covalently associated. In embodiments, the phrase "steric bulk" refers to the situation when the hydrocarbon moiety of the stabilizer compound that is coordinated to the pigment/precursor surface, occupies a 3-dimensional spatial volume that effectively prevents the approach or close association of other chemical entities (e.g. colorant molecules, primary pigment particles or small pigment aggregate) toward the pigment/precursor surface. Thus, the stabilizer should have its hydrocarbon moiety large enough so that as several stabilizer molecules become non-covalently associated with the chemical entity (pigment or precursor), the stabilizer molecules act as surface barrier agents for the primary pigment particles and effectively encapsulates them, and thereby limits the growth of the pigment particles and affording only nanoparticles of the pigment. For example, for the pigment precursor Lithol Rubine and for the organic pigment Pigment Red 57:1, the following illustrative groups on a stabilizer are considered to have adequate "steric bulk" so as to enable the stabilizer to limit the extent of pigment self-assembly or aggregation and mainly produce pigment nanoscale particles:

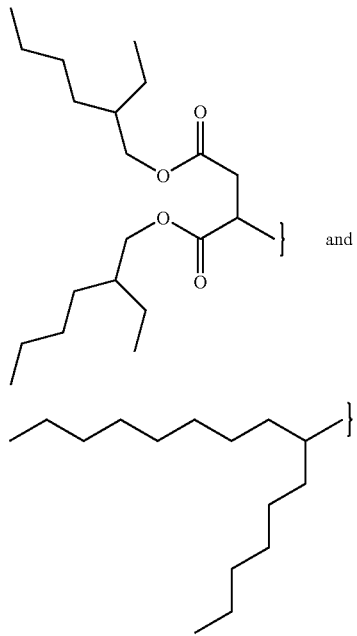

Representative examples of stabilizer compounds that have both the functional group that non-covalently associates with the pigment and the sterically bulky hydrocarbon moiety, include (but are not limited to) the following compounds:

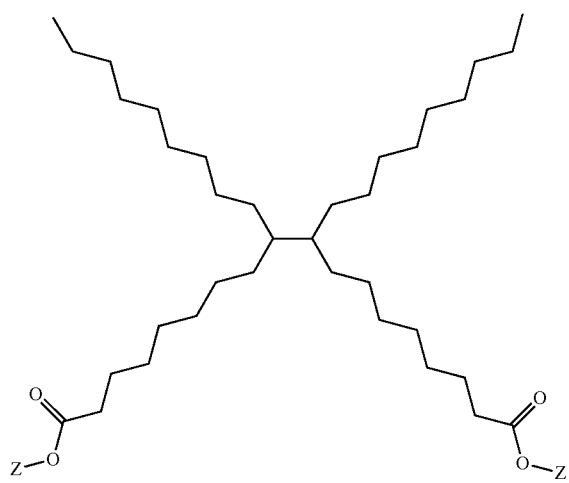

C36 Dimer Diacid

Z = H; Metal cations such as Na, K, Li, Ca, Ba, Sr, Mg, Mn, Al, Cu, B, and others;
Organic cations such as $NH_4^+$, $NR_4^+$, $PR_4^+$, and others

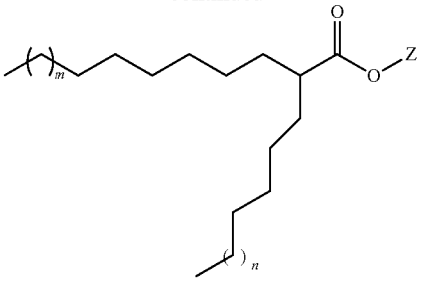

Z = H; Metal cations such as Na, K, Li, Ca, Ba, Sr, Mg, Mn, Al, Cu, B, and others;
Organic cations such as $NH_4^+$, $NR_4^+$, $PR_4^+$, and others and methylene units (m + N) > 1

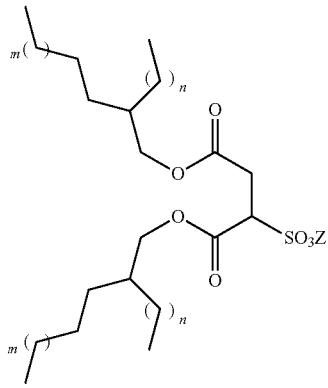

Z = H; Metal cations such as Na, K, Li, Ca, Ba, Sr, Mg, Mn, Al, Cu, B, and others;
Organic cations such as $NH_4^+$, $NR_4^+$, $PR_4^+$, and others and methylene units (m + N) > 1 per branch

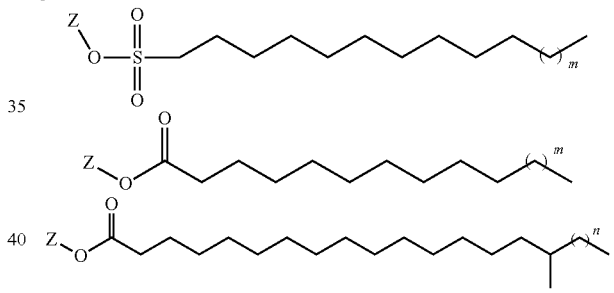

Z = H; Metal cations such as Na, K, Li, Ca, Ba, Sr, Mg, Mn, Al, Cu, B, and others;
Organic cations such as $NH_4^+$, $NR_4^+$, $PR_4^+$, and others and methylene units m ≥ 1 and for iso-stearic acid, n ≤ 1 wherein m and n denotes the number of repeated methylene units, and where m can range between 1 and 50, and n can range between 1 and 5, however the values can also be outside these ranges.

In additional embodiments, other stabilizer compounds having different structures than those described previously may be used in addition to sterically bulky stabilizer compounds, to function as surface active agents (or surfactants) that either prevent or limit the degree of pigment particle aggregation. Representative examples of such surface active agents include, but are not limited to, rosin natural products such as abietic acid, dehydroabietic acid, pimaric acid, rosin soaps (salts of rosin acids), hydrogenated derivatives of rosins and their alkyl ester derivatives made from methanol, glycerol or pentaerythritol or other such hydrocarbon alcohols, acrylic-based polymers such as poly(acrylic acid), poly(methyl methacrylate), styrene-based copolymers such as poly(styrene sodio-sulfonate) and poly(styrene)-co-poly(alkyl (meth)acrylate), copolymers of α-olefins such as 1-hexadecene, 1-octadecene, 1-eicosene, 1-triacontene and the like, copolymers of 4-vinyl pyridine, vinyl imidazole, and vinyl pyrrolidinone, polyester copolymers, polyamide copolymers, copolymers of acetals and acetates, such as the copolymer poly(vinylbutyral)-co-(vinyl alcohol)-co-(vinyl acetate).

The types of non-covalent association that can occur between the functional moiety of the precursor/pigment and the complementary functional groups of these surface stabilizers are, for example, van der Waals' forces, ionic or coordination bonding, hydrogen bonding, and/or aromatic pi-stacking bonding, or combinations thereof. In the case of monoazo laked pigments, the predominant non-covalent bonding association is ionic bonding, but can include hydrogen bonding and aromatic pi-stacking bonding as additional or alternative types of non-covalent bonding between the functional moieties of these stabilizer compounds and the precursor/pigment.

The "average" pigment particle size, which is typically represented as $d_{50}$, is defined as the median particle size value at the 50th percentile of the particle size distribution, wherein 50% of the particles in the distribution are greater than the $d_{50}$ particle size value and the other 50% of the particles in the distribution are less than the $d_{50}$ value. Average particle size can be estimated by using light scattering methods to infer particle size, such as Dynamic Light Scattering. The term "particle diameter" as used herein refers to the length of the pigment particle at the longest dimension (in the case of acicular shaped particles) as derived from images of the particles generated by Transmission Electron Microscopy (TEM).

The nanoscale pigment particles, when properly synthesized using the exemplary conditions and steric stabilizers outlined in the embodiments, were desirably ultrafine in particle size. For example, the material desirably has an average particle size of less than about 150 nm, such as about 10 nm to about 25, about 50, about 75, or about 100 nm. In embodiments, the nanosized pigment particles that were obtained for monoazo laked pigments can range in average particle size, $d_{50}$, or average particle diameter as measured by TEM imaging, from about 10 nm n to about 200 nm, such as from about 25 nm to about 150 nm, or from about 50 nm to about 125 nm. In embodiments, the particle size distributions can range such that the geometric standard deviation can range from about 1.1 to about 1.9, or from about 1.2 to about 1.7, as measured by dynamic light scattering method. The shape of the nanosized pigment particles can be one or more of several morphologies, including rods, platelets, needles, prisms, ellipsoidal or spherical, and the aspect ratio of the nanosize pigment particles can range from 1:1 to about 10:1, such as having the [length:width] aspect ratio between 1:1 and 7:1, or more preferably between 1:1 and 5:1; however the actual metric can lie outside of these ranges.

The method of making nano-sized particles of the monoazo laked pigments such as those listed in Table 7 is a process that involves at least one or more reaction steps. A diazotization reaction is a key reaction step for synthesis of the monoazo laked pigment, whereby a suitable aniline precursor is either directly or indirectly converted first to a diazonium salt using standard procedures, such as procedures that include treatment with a diazotizing agent such as nitrous acid $HNO_2$ (for example, generated in situ by mixing sodium nitrite with dilute hydrochloric acid solution) or nitrosyl sulfuric acid (NSA), which is commercially available or prepared by mixing sodium nitrite in concentrated sulfuric acid. The resulting acidic mixture of diazonium salt is either a solution or a suspension and in embodiments is kept cold, to which can optionally be added an aqueous solution of the metal salt ($M^{n+}$) that will define the specific composition of the desired monoazo laked pigment product, such as those listed in Table 7. The diazonium salt solution or suspension is then transferred into a solution or suspension of a suitable coupling component that can be either acidic or basic in pH and generally contain additional buffers and surface active agents, including the sterically bulky stabilizer compounds such as those described earlier, to produce the desired organic pigment as predominantly nanoscale particles, which is obtained as a wetted colored solid in an aqueous slurry.

In embodiments is disclosed a two-step method of making nanosized monoazo laked red pigments, for example Pigment Red 57:1, wherein an advanced pigment precursor commonly known as Lithol Rubine is first synthesized as a potassium salt and appears as a water-soluble orange dye. The first step involves the diazotization of 2-amino-5-methyl-benzene-sulfonic acid by first dissolving the reactant in dilute aqueous potassium hydroxide solution (0.5 mol/L) and cooling to a temperature of about –5° C. to about 5° C., and then treating the solution with an aqueous solution of sodium nitrite (20 wt %), following with slow addition of concentrated hydrochloric acid at a rate that maintains the internal reaction temperature between –5° C. and +5° C. The resulting suspension that forms is stirred for additional time at cool temperature, so as to ensure completeness of diazotization, and then the suspension is carefully transferred to a second solution containing 3-hydroxy-2-naphthoic acid dissolved in dilute alkaline solution (0.5 mol/L potassium hydroxide) using vigorous agitation as the colorant product is produced in the aqueous slurry. After stirring for additional time of at least 1 hour at room temperature, the colorant product (potassium salt of Lithol Rubine) is isolated by filtration as an orange dyestuff and washed with deionized water to remove excess acid and salt by-products.

The second step of this process involves redispersing the orange dyestuff (Lithol Rubine-potassium salt) in deionized water to a concentration that can range from about 0.5 wt % to about 20 wt %, such as from about 1.5 wt % to about 10 wt % or from about 3.5 wt % to about 8 wt %, but the concentrations can also be outside of these ranges. The colorant solids in the slurry is then dissolved completely into liquid solution by treatment with aqueous alkaline base, such as sodium hydroxide or potassium hydroxide or ammonium hydroxide solution, until the pH level is high, such as above pH 8.0 or above pH 9.0 or above pH 10.0. To this alkaline solution of dissolved Lithol Rubine colorant can be optionally added a surface active agent such as those described earlier, in particular embodiments surface active agent such as rosin soaps, delivered as an aqueous solution in the amount ranging from 0.1 wt % to 20 wt % based on colorant solids, such as in an amount ranging from 0.5 wt % to about 10 wt %, or in an amount ranging from 1.0 wt % to about 8.0 wt % based on colorant solids, but the amount used can also be outside of these ranges.

In embodiments, the preparation of ultrafine and nanosized particles of the monoazo laked Pigment Red 57:1 was only enabled by the additional use of a suitable steric stabilizer compound having branched hydrocarbons with either carboxylate or sulfonate functional groups, such as di[2-ethylhexyl]-3-sulfosuccinate sodium or sodium 2-hexyldecanoate, and the like. The stabilizer compound is introduced as a solution or suspension in a liquid that is predominantly aqueous but may optionally contain a polar, water-miscible co-solvent such as THE, iso-propanol, NMP, Dowanol and the like, to aid dissolution of the stabilizer compound, in an amount relative to colorant moles ranging from about 5 mole-percent to about 100 mole-percent, such as from about 20 mole-percent to about 80 mole-percent, or from about 30 mole-percent to about 70 mole-percent, but the concentrations used can also be outside these ranges and in large excess relative to moles of colorant.

Lastly, the metal cation salt is added to transform the pigment precursor into the desired monoazo laked pigment (Pigment Red 57:1 in embodiments) as a precipitated pigment. In embodiments, an aqueous solution of calcium chloride with concentration ranging anywhere from 0.1 mol/L to about 2 mol/L, is slowly added dropwise in nearly stoichiometric quantities such as amounts ranging from 1.0 molar equivalents relative to about 2.0 molar equivalents, or from 1.1 to about 1.5 molar equivalents, or from 1.2 to about 1.4 molar equivalents relative to moles of colorant, however the amounts used can also be outside of these ranges and in large excess.

The temperature during addition of the metal salt solution to cause precipitation of the pigment is also important. In embodiments, lower temperatures are desired, such as from about 10° C. to about 50° C., or from about 15° C. to about 35° C., but the temperature can also be outside of these ranges.

In another embodiment is disclosed a one-step method of making nano-sized monoazo laked red pigments, for example Pigment Red 57:1. The process involves preparing a first reaction mixture by dissolving the desired aniline precursor (for example, 2-amino-5-methyl-benzenesulfonic acid which is denoted as DC1 in Table 1) into aqueous ammonia solution (30% ammonium hydroxide) and cooling to a temperature anywhere in the range of about −5° C. to about 5° C., then treating the solution with an aqueous solution of sodium nitrite (20 wt %), following with slow addition of concentrated hydrochloric acid at a rate that maintains the internal reaction temperature between −5° C. and +5° C. The resulting suspension that forms is stirred for additional time so as to ensure completeness of diazotization. To the suspension is added the metal salt as either an aqueous solution or as a neat solid (for precipitating the pigment lake after coupling occurs). A second solution is prepared by dissolving or suspending the nucleophilic coupling component (denoted as CC, such as those shown in Tables 2-6, and Formulas (4)-(8)) mainly into water, which may optionally contain another liquid such as an organic solvent (for example, isopropanol, tetrahydrofuran, methanol, or other), and preferably alkaline base, for example aqueous ammonia, to render the coupling component into solution and aid reaction with the diazonium salt solution, and additionally buffers, and in particular embodiments surface active agent such as rosin soaps delivered as an aqueous solution in the amount ranging from 0.1 wt % to 20 wt % based on colorant solids, such as in an amount ranging from 0.5 wt % to about 10 wt %, or in an amount ranging from 1.0 wt % to about 8.0 wt % based on colorant solids, but the amount used can also be outside of these ranges. Further, in particular embodiments is also included the sterically bulky stabilizer compounds such as those described previously, delivered as an aqueous solution in the amount relative to colorant moles ranging from about 5 mole-percent to about 100 mole-percent, such as from about 20 mole-percent to about 80 mole-percent, or from about 30 mole-percent to about 70 mole-percent, but the concentrations used can also be outside these ranges and in large excess relative to moles of colorant The first reaction mixture containing the dissolved or suspended diazonium salt is then transferred slowly into the second solution or suspension of the desired nucleophilic coupling component, using vigorous agitation such as for example a high-speed mixer, and the temperature of the mixture can range from about 15° C. to about 75° C., in order to produce the laked monoazo pigment material suspended as a fine precipitate in an aqueous slurry. The pigment particles are isolated by either vacuum-filtration or centrifugal separation and washed with deionized water to remove excess salt by-products.

Pigment particles of monoazo laked pigments such as PR 57:1 that have small particle sizes could also be prepared by the above two-step method in the absence of using sterically bulky stabilizers and with the use of surface active agents alone (for example, only rosin-type surface agents), depending on the concentrations and process conditions employed, but the pigment product did not predominantly exhibit nanoscale particles nor did the particles exhibit regular morphologies. In the absence of using the sterically bulky stabilizer compound, either the one-step or the two-step methods described above typically produced rod-like particle aggregates, ranging in average particle diameter from 200-700 nm and with wide particle distribution, and such particles were difficult to disperse into a polymer coating matrix and generally gave poor coloristic properties. In embodiments, the combined use of a suitable sterically bulky stabilizer compound, such as branched alkanesulfonates or alkylcarboxylates, with a minor amount of suitable surface active agent such as derivatives of rosin-type surfactants, using either of the synthesis methods described previously would afford the smallest fine pigment particles having nanometer-scale diameters, more narrow particle size distribution, and low aspect ratio. Various combinations of these compounds, in addition to variations with process parameters such as stoichiometry of reactants, concentration, addition rate, temperature, agitation rate, reaction time, and post-reaction product recovery processes, enables the formation of nanoscale organic pigment particles.

Silica shell encapsulation of inorganic nanoparticles (such as silver, gold, and various metal oxides) has been described in the art. See, for example, the following: W. Stober et al., *J. Colloid Interface Sci.*, vol. 26, p. 62 (1968); C. Graf et al., *Langmuir*, vol. 19, p. 6693 (2003); Y. Lu et al., *Nano. Lett.*, vol. 2, p. 785 (2002); P. Mulvaney et al., *J. Mater. Chem.*, vol. 10, p. 1259 (2000); L. Liz-Marzan et al., *Langmuir*, vol. 12, p. 4329 (1996); and M. Darbandi et al., *Chem. Mater.*, vol. 17, p. 5720 (2005), the entire disclosures of which are incorporated herein by reference. However, the silica shell encapsulation has not been applied to organic nanopigments, where the silica shell passivates the pigment surface functionality, provides narrow particle size distribution and spheroidal particle morphology (low aspect ratio), and is of a suitable thickness to be optically transparent. The silica encapsulation is also thermally stable, particularly at ink printing operating temperatures.

In this disclosure, the processes of making the core-shell type organic nanopigments include the formation of a silica shell layer or coating of nanoscale thickness. Organic pigment nanoparticles have high surface area and surface potential, which can pose significant challenges for their use in dispersions, for performing subsequent surface treatments or chemical functionalization, or even for the shell formation. Two general methods can be used for depositing and encapsulating a surface shell layer of silica onto particles, which are: 1) a sol-gel process that involves hydrolysis and condensation of a silica precursor reagent on the surface of a core particle (often referred to as a Stöber-type method, first published in *J. Colloid Interface Sci.* 1968, v. 26, p. 62) by Stöber, Fink and Bohn; and 2) a micro-emulsion process as described in *Chem. Mater.* 2005, v. 17, p. 5720, that utilizes a silane coupling agent to first coat the surface of the core particle, which in turn helps to anchor in silica micelles produced from an oil/water micro-emulsion, and results in a smooth, continuous silica shell. In embodiments, a sol-gel polymerization similar to the Stober-type method is used for silica shell encapsulation of nanoscale organic pigment particles. The physical characteristics of the applied silica shell layer, such as thickness, transparency, porosity, and general morphology, are mainly controllable and tunable by the detailed process conditions, such as pH, catalyst choice, temperature, stoichiometry and concentration of reagents, reaction time, and agitation. Of course, other methods and modifications will be apparent based on the present disclosure.

In order to prepare the organic pigment nanoparticles for further surface functionalization, such as shell-type encapsulation with inorganic oxides such as silica, titania and the like, it is desirable to treat the nanoparticle surface with a "primer" agent that enhances the affinity of the pigment particle surface for anchoring in the silica precursor reagent for depositing a silica shell, which is typically an alkoxysilane or hydrolyzed alkoxysilane reagent. The use of a primer agent is optional and the composition of the primer will depend on the type of organic pigment core comprised within a core-shell encapsulated pigment, in addition to the process conditions used. However, in most practical cases where there the core organic pigment particle has low surface potential and low polarity, use of a primer agent will ensure successful sol-gel polymerization of the alkoxysilane precursor, and lead to good deposition of a silica shell layer.

The optional primer agent can be a small organic molecule or a macromolecule, and typically contains one or more functional groups that contains a heteroatom such as N, S, O, and/or P, and in many instances, the functional group is a weak to moderately nucleophilic group that is electron-donating. The primer agent can be either positively or negatively charged, such as an ionic species or zwitterionic species, or can be charge neutral. For encapsulating nanoscale particles of non-ionic organic pigments, in particular particles having non-regular morphology (platelets, needles), the primer agent is preferably an organic homopolymer or copolymer material, or it can be a small organic molecular having more than one functional group containing said heteroatoms. The primer agent that can be used for non-ionic organic pigments, such as nanoscale quinacridone pigments, can be selected from the following examples of polymer compounds and small organic compounds, including but not limited to: homopolymers and copolymers of poly(vinylpyrrolidone), homopolymers and copolymers of poly(styrene) or poly(styrene 4-sulfonate), homopolymers and copolymers of poly(4-vinylpyridine); homopolymers and copolymers of poly(vinylimidazole); homopolymers and copolymers of polyalkyleneimines; homopolymers and copolymers of poly(vinylbutyral); homopolymers and copolymers of polyesters, amide-terminated polyesters, polyamides, and ester-terminated polyamides that are each prepared from alkanedioic acid monomers and/or alkanediol monomers; homopolymers and copolymers of succinate diesters, succinic acid diamides, succinic anhydrides or succinimides, including the reaction products of polyalkyleneamines and polyisobutylene succinic anhydrides or polyisobutylene succinimides; and multifunctional small molecules such as primary and secondary alkylamines or ammonium salts; alkanediamines and their ammonium salts; alkanethiols, alkane aminothiols, alkane aminoalcohols, alkane aminocarboxylic acids or derivatives like alkanamides/-alkane(thio)esters/-alkylamidines/-alkylimines/-alkylhydrazones, wherein the alkyl or alkane group is a linear, branched or cyclic alkyl group containing 2 or more carbons.

In embodiments, the surface treatment of an ionic organic pigment, such as a monoazo laked pigment, is performed with one or more amphiphilic polymer compounds and using a Layer-by-Layer technique. As described in *Langmuir,* 2000, 16, pp. 8932-36, the technique involves dispersing the organic pigment particles in an aqueous medium, treating with a first solution containing an ionic, amphiphilic polymer compound which deposits as a continuous thin layer onto the particle surface. Thereafter, the water-suspended organic pigment particles are treated with a second solution containing a different amphilic polymer compound that has opposite ionic charge to the first deposited ionic polymer. The alternating deposition of solutions of oppositely charged, ionic and amphiphilic polymer compounds results in a thin polymeric primer layer onto the pigment particle surface, which prepares the surfaces of the nanoscale pigment particles for subsequent reaction with alkoxysilane agents as the chemical precursors for the silica shell layer.

In embodiments, the surface encapsulation of nanoscale particles of monoazo laked pigment is best achieved using amphiphilic polymer compounds that have ionic or ionizable functional groups (either positive or negative) with good bonding affinity for the sulfonate and/or carboxylate functional moieties of the pigment. Suitable examples of amphiphilic polymers having anionic and/or anionically ionizable functional groups include, but are not limited to, the following compounds: (meth)acrylic acid type polymers and copolymers such as poly(acrylic acid), poly(methacrylic acid), poly(alkyl acrylate-co-acrylic acid), poly(styrene-alkyl acrylate-acrylic acid), poly(styrene-butadiene-acrylic acid), poly(alkyl methacrylate-acrylic acid), poly(styrene-acrylonitrile-acrylic acid), poly(alkyl acrylate-acrylonitrile-acrylic acid), poly(styrene-butadiene-methacrylic acid), poly(styrene-butadiene-acrylonitrile-acrylic acid), poly(styrene-butyl acrylate-acrylic acid), poly(styrene-alkyl acrylate-methacrylic acid), poly(styrene-alkyl acrylate-beta-carboxy ethyl acrylate), sodium, potassium, lithium or ammonium salts of poly(4-styrene sulfonate), sodium, potassium, lithium or ammonium salts of poly(styrene-co-4-styrene sulfonate), sodium, potassium, lithium or ammonium salts of poly(styrene-butadiene-co-4-styrene sulfonate), poly(anetholesulfonic acid, sodium salt); sodium, potassium, lithium or ammonium salts of poly(4-styrenesulfonic acid-co-maleic acid), sodium, potassium, lithium or ammonium salts of poly(alkyl methacrylates-co-4-styrene sulfonate), sodium, potassium, lithium or ammonium salts of poly(styrene-alkyl acrylate-4-styrene sulfonate), and the like.

Suitable examples of amphiphilic polymers having cationic and/or cationically ionizable functional groups include, but are not limited to, the following compounds: 1) polymers and copolymers of vinyl pyridines, such as poly(4-vinyl pyridine), poly(2-vinyl pyridine), poly(styrene-4-vinyl pyridine), poly(styrene-2-vinyl pyridine), and the like; 2) polymers of vinyl pyrrolidones, such as poly(1-vinylpyrrolidinone), poly(4-vinylpyrrolidinone) and copolymers of vinyl pyrrolidinones made with (i) alpha-olefins such as 1-hexadecene, 1-octadecene, 1-eicosene, 1-triacontene and the like; (ii) substituted styrenes such as 4-methylstyrene, 4-chlorostyrene, 4-hydroxystyrene, 4-aminostyrene, 4-carboxyalkylstyrenes, and the like; (iii) substituted (meth)acrylates, such as diethylaminoethyl methacrylate, dimethyl aminoethyl methacrylate, monoethylaminoethyl methacrylate, t-butylaminoethyl methacrylate, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, dimethylaminopropyl acrylate, dimethylamino propyl methacrylate, dipropylaminoethyl acrylate, 2-pyrrolidinoethyl methacrylate, 3-(dimethylaminoethyl)-2-hydroxypropyl acrylate, 3-(dimethylaminoethyl)-2-hydroxypropyl methacrylate, 2-aminoethyl acrylate, 2-aminoethyl methacrylate, and the like; (iii) vinyl or allyl ethers, such as dimethylaminoethyl vinyl ether, diethylaminoethyl vinyl ether, aminoethyl vinyl ether, and the like; 3) polymers and copolymers of vinyl imidazoles, such as those disclosed, for example, in U.S. Pat. No. 5,773,545, the entire disclosure of which is incorporated herein by reference, and those prepared from 1-vinyl methylimidazole, 1-imidazolyl-para-methylstyrene, 2-methyl-1-vinylimidazole, 2-ethyl-1-vinylimidazole, 2-propyl-1-vinylimidazole, 2-butyl-1-vinylimidazole, 2,4-dimethyl-1-vinylimidazole, 2,5-dimethyl-1-vinylimidazole, 2-ethyl-4-methyl-1-vinylimidazole, 2-ethyl-5-methyl-1-vinylimidazole, 2,4,5-trimethyl-1-vinylimidazole, 4,5-diethyl-2-methyl-1-vinylimidazole, 4-methyl-1-vinylimidazole, 4-ethyl-1-vinylimidazole, 4,5-dimethyl-1-vinylimidazole, 5-methyl-1-vinylimidazole, and 2,4,5-triethyl-1-vinylimidazole. Other suitable materials are disclosed in, for example, *J. Inorg. Biochem.*, v. 17, pp. 283-91 (1982), the entire disclosure of which is incorporated herein by reference; 4) polymers and copolymers of dialkyldialkyl ammonium halides, such as poly(diallyldimethyl ammonium chloride), poly(diallydiethyl ammonium chloride), and the like; 5) polymers and copolymers of dialkylaminoethyl (meth)acrylates, such as poly(N,N-dimethylaminoethyl methacrylate), poly(vinylpyrrolidinone-co-N,N-dimethylaminoethyl methacrylate), and the like; 6) polyesters terminated with ammonium salts, such as tetramethylammonium poly(12-hydroxystearic acid) terminated with acid end-groups, ammonium salts of amide-terminated polyesters, such as tetramethylammonium salt of 2-aminoethyl-amido terminated poly(12-hydroxystearic acid), and other tetraalkylammonium salts of such amide-terminated polyesters, such as is found in selected SOLSPERSE® dispersant polymers (available from Lubrizol corporation); 7) polyamides terminated with ammonium salts, such as poly(alkylenediamine-co-alkanedioic acid) with tetramethylammonium salt end groups; and ammonium salts of acid-terminated polyamides, such as the tetraalkylammonium salts of poly(alkylenediamine-co-alkanedioic acid) and poly(alkylenoxydiamine-co-alkanedioic acid) and the like; 8) polymers containing heterocyclic monomer groups, such as polyesters, polyamides, polyethyleneoxides that have terminal grafted heterocyclic functional groups, including heterocycles containing at least one nitrogen and/or one oxygen and/or one sulfur atom; examples of such heterocyclic functional groups include, but are not limited to, pyridinyl, pyrrolyl, pyrrolidinyl, piperidinyl, piperazinyl, pyrazolyl, imidazolyl, benzimidazolyl, imidazolinonyl, benzimidazolinonyl, oxazolinyl, oxazolyl, oxazolidinonyl, benzoxazolinyl, triazinyl, indolyl, indenyl, benzindenyl, indenonyl, benzindenonyl, carbazolyl, thiazolyl, thiazolinyl, pyridinonyl, pyrimidinyl, pyrimidinonyl, picolinyl, acridonyl, benzacridonyl, quinacridonyl, ureido-substituted and alkylcarbamoyl-substituted heterocycles such as ureidopyrimidinones, ureidopyridinones and ureidotriazines, and the like; and 9) oligomers and polymers that contain a succinimide or phthalimide functional group, such as polyisobutylene succinimides or alkylene succinimides wherein the alkylene group contains from 4 to about 20 carbons and the succinimide nitrogen atom is substituted with an alkyl group, alkylaryl group, or aryl groups containing from 1 to about 20 carbons.

The primer agent can be added directly to the reprecipitation solution as disclosed in the reprecipitation methods described previously, or alternatively introduced onto the surfaces of organic pigment nanoparticles after they are synthesized and isolated. In the latter preferred case, the primer agent, which is preferably a polymeric material, is added into a suspension of the wetted nanoscale organic pigments under vigorous agitation such as by use of high-speed mechanical stirring or homogenization or other means. The pigment nanoparticles can be wetted with any suitable or desired liquid, including: polar liquids such as water, alcohols, or other water-miscible liquids such as glycols and the like; aprotic and non-polar liquids such as simple ketones and esters like acetone, methyl ethyl ketone, methyl isobutyl ketone, cyclohexanone, ethyl acetate, butyl acetate, methoxypropyl acetate, N-methylpyrrolidinone, sulfolane, N,N-dimethylformamide, N,N-dimethylacetamide, and the like; ethers such as tetrahydrofuran, dimethoxyethane, mono-alkyl ethers of diethylene or dipropylene glycols such as DOWANOL® and the like; and mixtures thereof; and hydrocarbon liquids such as hexanes, toluene, xylenes, Isopar and the like; and mixtures thereof.

The polymer primer agent can be added into the process for surface treatment of nanoscale pigment particle in any desired amount that is suitable for the subsequent silica shell encapsulation, such as a loaded amount ranging from about 1 wt % to about 100 wt % or from about 2 wt % to about 75 wt %, or preferably from about 5 wt % to about 50 wt %, although it can also be outside of these ranges. The temperature used for the surface treatment of the nanoscale organic pigment particles with the polymer primer agent is preferably room temperature, although the temperature can also range from about 10° C. to about 80° C., or from about 20° C. to about 50° C., or any temperature outside this range.

Additional examples of suitable primer agent materials, including polymers as well as selected small organic molecules, that are added either during the synthesis process of preparing the pigment nanoparticles by reprecipitation or after recovery of the pigment nanoparticles, include but are not limited to the following: taurine hydrochloride, 4-aminobutyric acid, 6-aminohexanoic acid, and the like; poly(1-vinylpyrrolidone), poly(1-vinylpyrrolidone)-graft-(1-hexadecene), poly(1-vinylpyrrolidone)-graft-(1-triacontene), poly(1-vinylpyrrolidone-co-acrylic acid), poly(1-vinylpyrrolidone-co-N,N-dimethylaminoethylmethacrylate), poly(vinylimidazole), poly(styrene-alt-maleic anhydride), poly(vinyl alcohol-co-vinyl acetate-co-vinyl butyral) terpolymer commercially known as Mowital® B30HH (available from Hoechst A.G.), succinimide-based commercial polymers such as the OLOA® family of polyisobutylene succinimide dispersants (available from Chevron Oronite), succinimide-based dispersants such as Ircosperse® 2153 (available from Lubrizol Corp., Cleveland, Ohio), poly(styrene-co-4-vinylpyridine) such as is described in U.S. Pat. No. 5,384,222 by Xerox Corp., dispersants based on polyesters, amide-terminated polyester, polyamides and ester-terminated polyamides such as the Solsperse Hyperdispersants®, including Solsperse® 17000 (available from Lubrizol Corp.), and the like.

In embodiments, the amphiphilic polymers primer agents can have anywhere from 1 mmol % to about 75 mol % of monomers units having the pigment-affinic, ionic or ionizable groups, or from about 1 mol % to about 50 mol %, or preferably up to about 30 mol % of monomers having pigment-affinic, ionic or ionizable groups, although the actual content can be anywhere outside this range.

Examples of non-pigment affinic monomer units that can comprise the amphiphilic polymer primer agents include, for example, acrylate-based monomers and styrene-based monomers. Specific examples of such non-pigment affinic monomer units include but are not limited to styrene, methylstyrene, ethylstyrene, chlorostyrene, hydroxystyrene, methoxystyrene, norbornene, itaconic acid, 1-alkenes (alpha-olefins) such as 1-eicosene, 1-octadecene, 1-hexadecene, 1-dodecene, 1-decene, 1-octene, and the like, alkyl acrylates, aryl acrylates, alkyl methacrylates, aryl methacrylates, 1,3-butadiene, isoprene, acrylic acid, methacrylic acid), acrylonitrile, substituted succinic anhydrides such as polyisobutylene succinic anhydride, and the like. Mixtures of two or more of monomers can also be used, if desired.

In embodiments, the surface treatment of nanoscale monoazo laked pigment particles involves first washing the particles with deionized water to remove excess unwanted salts or steric stabilizer additives from the pigment synthesis, and recovering the wet pigment by either centrifugation or fine filtration using filter membrane cloths. The pigment particles are then resuspended and stirred into a polar liquid or aqueous solution containing the polymeric primer agent, preferably one that is amphiphilic with ionic groups, such as for example, with sodium poly(4-styrene sulfonate) or poly (diallyldimethylammonium chloride) or consecutively with both. The concentration of the amphiphilic ionic polymer in the polar liquid or aqueous solution can range from about 0.1 wt % to about 80 wt %, or 0.5 wt % to about 50 wt %, or preferably from about 1 wt % to about 25 wt %, although the actual concentration can be anywhere outside this range. In certain cases, the dissolution or dispersion of the ionic polymer in water as the only liquid medium may be preferable at a temperature higher than room temperature, such as from about 20° C. to about 80° C., or to about 50° C., or to about 35° C. The total amount of ionic polymers to be used as the surface primer agent to facilitate the deposition of the subsequent silica shell layer is dependent on the chemical composition of the polymer primer, the degree of ionic or ionizable functional groups, and the molecular weight. The preferred molecular weights of such polymers can range from about 1000 g/mol to about 500,000 g/mol, or from about 3000 g/mol to about 300,000 g/mol, or from about 5000 g/mol to about 100,000 g/mol, although the actual molecular weight values for any desirable ionic polymer can be outside of this range.

In embodiments, the silica shell layer applied to the organic nanopigment particles is suitably thin and having a nanometer-sized thickness so as to be optically transparent and not to substantially alter or mask the pigment coloristic properties. Typically, the shell thickness can be less than about 50 nm, such as about 5 to about 50 nm, although thinner or thicker shells can be used as long as the encapsulation effects are provided.

There exist various processes by which the silica shell can be provided on the organic nanopigment particles, and any such methods are suitable for use according to the present disclosure. Most or all of these methods involve a sol-gel reaction, based on the hydrolysis of a silica precursor reagent, such as tetraethoxysilane (TEOS) or tetramethoxysilane (TMOS) in the presence of either water or an alcohol solvent, followed by condensation polymerization of the silicic acid intermediate under basic or acidic conditions. A base or acid catalyst is also often used to significantly increase the rate of the hydrolysis of the silica precursor reagent in alcohol solvents. Further, a base catalyst, such as ammonia-water, is desired for use particularly for morphology control when wanting to produce spherical particles. While any conventional sol-gel method can be used, a desirable method is a pH-mediated hydrolysis and condensation method, in view of the pH changes that occur in many of the methods for producing organic nanoscale pigment particles, such as those described above. In embodiments, the formation of silica-encapsulated nanoscale organic pigment particles is generally a two-stage process, where the shell is formed after the organic nanoparticle pigment formation, which has the benefit of being applicable to nanoparticle pigments that are formed from a wider range of processes, including those that may not be as amenable to pH control.

In the general two-stage process, the silica shell formation or encapsulation is conducted subsequent to the organic pigment nanoparticle formation. In the first step of the two-stage process, the organic pigment nanoparticles are synthesized or prepared at a desired particle size and morphology, and have one or more steric stabilizers that are non-covalently associated onto the particle surface. The organic pigment nanoparticles are isolated by standard methods such as filtration or centrifugation, then washed as desired, and optionally are subjected to a surface-treatment with a liquid solution of a suitable amphiphilic primer agent that is preferably polymeric and contains pigment-affinic functional groups, such as those described in embodiments.

Following the optional surface treatment with the primer agent, the organic pigment nanoparticles can be isolated by filtration or centrifugation and washed as desired. The wetted pigment nanoparticles are then resuspended into an alcohol solvent such as ethanol, methanol, isopropanol and the like, and prepared for the second stage of the process where the silica encapsulation is applied to the nanoparticles by way of a Stöber-type sol-gel polymerization process. The concentration of wet pigment solids in the alcohol suspension can be any suitable amount to achieve the goal of encapsulation, such as from about 0.1 to about 10 wt %, and preferably between 0.1 and 1.0 wt %, although an amount outside these ranges may also be used. The amount of water is also important to promote hydrolysis of the alkoxysilane precursor. Since in embodiments the process uses wetted pigment nanoparticles that are obtained as the wet filtercake from the pigment synthesis and/or from the surface treatment of the particles with an aqueous solution of primer agent, the existing water present is typically of a sufficient level for the encapsulation process. The volume-percent ratio of [$H_2O$:alcohol] liquids present in the encapsulation step can range from about 0.1 v/v % to about 25 v/v %, and preferably from about 1 v/v % to about 10 v/v %, although the amount can also be outside of these ranges.

In the second step of the two-stage process, the wet pigment nanoparticles that are suspended in a liquid alcohol, such as an ethanol suspension, are treated with a suitable silica precursor reagent that is generally an alkoxysilane reagent for the sol-gel condensation and polymerization process. If it is desired to prepare a shell layer of hydrophilic, non-functionalized silica, $SiO_2$, the preferred precursor reagent is a tetra-alkoxysilane wherein the alkoxy group corresponds or matches the alcohol solvent used to prepare the pigment suspension. For example, ethanol solvent is used when the silica precursor reagent is tetraethoxysilane (commonly referred to as tetraethylorthosilicate), and similarly methanol solvent is used for reaction with tetramethoxysilane (or, tetramethylorthosilicate). The reasons for matching the solvent with the alkoxyl group of the silica precursor reagent are due to the chemical reaction mechanisms and to enable a fast rate of hydrolysis and condensation of the alkoxysilanes to give silicic acid (in acidic pH), sodium silicate (at alkaline pH), and/or a partially hydrolyzed alkoxy-hydroxysilane, which is discussed in detail in the aforementioned references. Following the metered addition of the silica precursor reagent, which is typically performed using a syringe pump or other metering device, the suspension is allowed to stir at ambient temperature for a period of time before the addition of either an acid or base catalyst as a next step, which promotes the hydrolysis and condensation reactions of the alkoxysilane precursor reagent. In embodiments, the pH is next adjusted to a pH level greater than 7 by the addition of a base catalyst, which promotes multiple condensations of the silica species that lead to polymerized silica particles and silica clusters. It is these silica particles or clusters that constitute the 'gel' network of the silica shell layer, which becomes more dense during the course of the polymerization reaction. Following this base-catalyzed poly-condensation period, which can vary between 2 and 24 hours, the silica-encapsulated pigment nanoparticles are recovered using standard methods such as filtration and centrifugation, washed and dried for further characterization.

Any suitable silica precursor material can be used to provide the desired silica shell layer using a sol-gel polymerization process. For example, known compounds comprising alkoxysilyl or hydroxysilyl groups suitable for use in the present processes include: alkyltrialkoxysilanes, such as, phenyltrimethoxysilane, methyltrimethoxysilane, methyltriethoxysilane, 3-glycidoxypropyltrimethoxysilane, 3-trifluoropropyl-trimethoxysilane, methacryloxypropyltriethoxysilane, triethoxysilylisobutyl-POSS (POSS is polyhedral oligomeric silsesquioxane), octa(trichlorosilylethyl)-POSS, and the like; tetraalkoxysilanes, such as, tetramethoxysilane ("TMOS", commonly referred to as tetramethylorthosilicate), tetraethoxysilane ("TEOS", commonly referred to as tetraethylorthosilicate) and oligomeric condensates of TEOS such as ethylsilicate 40, tetraisopropoxysilane, tetrapropoxysilane, tetraisobutoxysilane, tetrabutoxysilane, and the like. Other siloxane compounds include, but are not limited to, bis(triethoxysilyl)methane, 1,9-bis(triethoxysilyl)nonane, diethoxydichlorosilane, triethoxychlorosilane, and the like. Other suitable precursor sol-gel materials include, but are not limited to, titanium (IV) isopropoxide, titanium (IV) methoxide, diisopropoxybisethylacetoacetato titanate, triethanolamine titanate, triethanolamine zirconate, aluminum sec-butoxide, and the like.

The amount of alkoxysilane precursor reagent can be varied, which may in turn provide various effects on the shell layer characteristics, such as thickness and morphology, for the desired core-shell particle composition. In embodiments, the concentration of the alkoxysilane precursor reagent can range from about 1 mM to about 50 mM, and preferably in the range from about 5 mM to about 30 mM, although the concentration can also be outside of this range. In addition, the molar ratio of [alkoxysilane:pigment] can vary widely depending on the desired thickness of the shell layer and the surface-area of the core pigment nanoparticles that will be coated. In general, a silica shell layer of nanoscale thickness, which is one that is desirably less than 50 nm, could be obtained using a molar ratio for [alkoxysilane:pigment] that ranges from about 1:1 to about 10:1, although the value of molar ratio can also be outside of this range.

When carrying out the process of sol-gel polymerization of the alkoxysilane reagent, a catalyst is typically used to increase the rate and the extent of both the hydrolysis and condensation (polymerization) reactions. The choice of catalyst can be a protic acid or a base, in particular those that are soluble in alcohols and water. Suitable acids that can be used are preferably strong acids that include, but are not limited to, mineral acids such as hydrochloric acid, hydrofluoric acid, sulfuric acid, nitric acid, and the like; as well as organic acids such as acetic acid, trifluoroacetic acid, trichloroacetic acid, oxalic acid, formic acid, glycolic acid, glyoxylic acid, and the like; or a polymeric acid such as poly(acrylic acid) and its copolymers, and the like; mixtures thereof, and the like. The acid catalyst can be used at varying strengths and concentrations, however since the kinetics of hydrolysis reaction is first-order in acid concentration, higher acid concentrations and/or higher acid strength are preferable. This is particularly preferred if the sol-gel polymerization process is carried out at low pH below 2, where the rate of condensation of monomers (to produce silica particles) is proportional to acid concentration.

In embodiments, the sol-gel polymerization process is carried out at pH levels greater than 2, and most preferably at a pH level greater than 7, whereby the rate of condensation of alkoxysilane monomer (or, partially hydrolyzed alkoxysilane monomer) is proportional to the base concentration. To achieve this condition, the process disclosed in embodiments can be carried out by either using a base catalyst exclusively throughout the process, or in combination with an acid catalyst to promote the initial hydrolysis of the alkoxysilane monomer, followed with a base-catalyzed polymerization process. Suitable choices of base catalysts are generally proton-acceptors instead of Lewis bases, and soluble in alcohols and water, such as ammonia-water, hydroxides of Group 1 or Group 2 metals, as well as organic amine bases such as N,N-diethylaminoethanol, 1,4-diazabicyclo[2.2.2]octane, pyridine, 4-(N,N-dimethylamino)pyridine, piperidine, piperazine, pyrrolidine, morpholine, imidazole, and similar heterocyclic or non-aromatic bases. The amount of base catalyst can vary widely depending on the base strength and the relative molar ratio with the alkoxysilane precursor reagent. In embodiments, the concentration of base catalyst can range from about 0.02 to 1.0 M, and preferably from about 0.05 to 0.75 M, however the value can also be outside this range. The molar ratio of [base:alkoxysilane] can also vary greatly depending on the process conditions that are used, and the ratio can range from about 1:1 to about 20:1 or to about 10:1, although the actual ratio can also be outside these ranges.

If desired, the silica shell surface can be further functionalized, such as to improve the dispersion properties in certain ink vehicles or carrier materials. For example, if desired, the silica shell surface can be functionalized with alkyl groups having from about 1 to about 20 carbon atoms through the use of a suitable alkyl-substituted alkoxysilane or alkyl-substituted chlorosilane reagents. Such functionalization can also be achieved by other known methods that will be apparent based on the present disclosure. In embodiments, the surface functionalization can be with hydrophobic groups, to provide hydrophobic surface properties to the silica encapsulated organic pigment.

In embodiments, the slurry of silica encapsulated pigment nanoparticles is not treated nor processed any further, such as additional heating, but instead is isolated by vacuum filtration through membrane filter cloth or by centrifugation. The silica encapsulated pigment nanoparticles can be washed copiously with deionized water to remove excess salts or unwanted additives. The silica encapsulated pigment solids can be subsequently dried by freeze-drying under high vacuum to afford high quality, non-agglomerated pigment particles that when imaged by TEM, exhibited primary pigment particles and small aggregates ranging in diameters from about 30 nm to about 200 nm, and predominantly from about 50 nm to about 150 nm. The silica shell layer can be identified by TEM imaging as an electron-dense continuous layer with partially diffuse surface texture, or as tight array of circular deposits cemented onto the pigment particle surface that give a bumpy texture. The shell layer has variable thicknesses, which are nanometer-sized in dimension and less than about 50 nm thick, and offers an optically transparent surface and does not mask the pigment coloristic properties.

Characterization of the physical and chemical composition of washed and dried nanosized pigment particles can be performed by thermal gravimetric analysis (TGA) as an estimate of residual inorganic oxides such as silica (among others that may be present in the sample), by Inductively Coupled Plasma spectroscopy (ICP) for analysis of silicon, by X-ray diffraction spectroscopy, and by EDXA analysis for Si when performing Scanning Electron Microscopy (SEM) imaging on the particle surface.

Controlling the interfacial interactions between pigment particle surface and surrounding matrix in a pigment dispersion, such as in inks, paints, toners and the like, are paramount to obtaining the desired pigment's properties. The advantage of this invention for preparing core-shell type silica-encapsulated nanoscale pigment particles is that the silica encapsulation allows the core nanopigment material to be changed or adjusted for different coloristic, dispersion, or thermal stability properties without having to reformulate the entire ink vehicle due to a change in the colorant material. That is, the silica encapsulation tends to passivate any performance property changes that can result when one colorant material is substituted for another colorant material. As such, ink formulations such as ink vehicle, additives, and the like, do not need to be reformulated when a different colorant material is to be used.

The formed silica encapsulated nanoscale pigment particle compositions can be used, for example, as coloring agents in a variety of compositions, such as in liquid non-aqueous ink vehicles, including inks used in conventional pens, markers, and the like, liquid ink jet ink compositions, solid or phase change ink compositions, and the like. For example, the colored nanoparticles can be formulated into a variety of ink vehicles, including non-polar liquid inks, phase-change inks and solid inks with melt temperatures of about 60 to about 130° C., in addition to solvent-based liquid inks or radiation-curable such as UV-curable liquid inks and UV-curable gel inks comprised of alkyloxylated monomers, and also aqueous inks. Various types of such compositions will now be described in more detail.

The formed nanoscale pigment particle compositions can be used, for example, in phase-change ink compositions as colorants. The phase-change inkjet ink compositions generally include a carrier, a colorant, and one or more additional additives. Such additives can include, for example, solvents, waxes, antioxidants, tackifiers, slip aids, curable components such as curable monomers and/or polymers, gallants, initiators, sensitizers, humectants, biocides, preservatives, and the like. Specific types and amounts of components will depend, of course, on the specific type of ink composition, such as liquid, curable, solid, hot melt, phase change, gel, or the like.

Generally, the ink compositions contain one or more colorant. Any desired or effective colorant can be employed in the ink compositions, including pigment, dye, mixtures of pigment and dye, mixtures of pigments, mixtures of dyes, and the like. In embodiments, the colorant used in the ink composition consists entirely of the formed nanoscale pigment compositions. However, in other embodiments, the nanoscale pigment compositions can be used in combination with one or more conventional or other colorant material, where the nanoscale pigment compositions can form substantially most of the colorant material (such as about 90% or about 95% by weight or more), they can form a majority of the colorant material (such as at least 50% by weight or more), or they can form a minority of the colorant material (such as less than about 50% by weight). For the end-use application in piezoelectric inkjet printing, nanoscale pigment particles are advantageous to ensure reliable inkjet printing and prevent blockage of jets due to pigment particle agglomeration. In other embodiments, the nanoscale-sized pigment compositions can be included in the ink composition in any other varying amount, to provide either colorant and/or other properties to the ink composition.

The colorant, such as silica-encapsulated nanoscale organic pigment compositions in embodiments, can be present in the ink composition in any desired or effective amount to obtain the desired color or hue. For example, the colorant can typically be present in an amount of at least about 0.1 percent by weight of the ink, such as at least about 0.2 percent by weight of the ink or at least about 0.5 percent by weight of the ink, and typically no more than about 50 percent by weight of the ink, such as no more than about 20 percent by weight of the ink or no more than about 10 percent by weight of the ink, although the amount can be outside of these ranges.

The ink compositions can also optionally contain an antioxidant. The optional antioxidants of the ink compositions protect the images from oxidation and also protect the ink components from oxidation during the heating portion of the ink preparation process. Specific examples of suitable antioxidants include NAUGUARD® series of antioxidants, such as NAUGUARD® 445, NAUGUARD® 524, NAUGUARD® 76, and NAUGUARD® 512 (commercially available from Uniroyal Chemical Company, Oxford, Conn.), the IRGANOX® series of antioxidants such as IRGANOX® 1010 (commercially available from Ciba Geigy), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount can be outside of these ranges.

The ink compositions can also optionally contain a viscosity modifier. Examples of suitable viscosity modifiers include aliphatic ketones, such as stearone, and the like. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink, although the amount can be outside of these ranges.

Other optional additives to the inks include clarifiers, such as UNION CAMP® X37-523-235 (commercially available from Union Camp); tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like; adhesives, such as VERSAMID® 757, 759, or 744 (commercially available from Henkel), plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like; and the like. Such additives can be included in conventional amounts for their usual purposes.

The ink composition also includes a carrier material, or mixture of two or more carrier materials. The carrier material can vary, for example, depending upon the specific type of ink composition. For example, suitable solvents and carrier materials include those discussed above.

In embodiments of the non-aqueous inks, the nanoscale pigment composition can be used as colorants for solvent-borne inks such as petroleum-based inks which can include aliphatic hydrocarbons, aromatic hydrocarbons, and mixtures thereof, environmentally friendly soy and vegetable oil-based inks, linseed oil-based inks and other ink-based vehicles derived from natural sources. Other examples of ink vehicles for nanoscale pigment particles include isophthalic alkyds, higher order alcohols and the like. In still other embodiments, the present invention of nanoscale pigment particles can be applied towards inks used in relief, gravure, stencil, and lithographic printing.

The ink compositions of the present disclosure can be prepared by any desired or suitable method. For example, the ink ingredients can simply be mixed together with stirring to provide a homogeneous composition, although heating can also be used if desired or necessary to help form the composition.

Examples are set forth herein below and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

Synthesis of Nanoscale Particles of Monoazo-Laked Pigment (Red 57:1)

Step 1: Diazotization and Coupling:

Into a 500 mL round bottom flask equipped with a mechanical stirrer, thermometer, and addition funnel is dissolved 2-amino-5-methylbenzenesulfonic acid (12.15 g) into 0.5M KOH aqueous solution (135 mL). The solution is cooled to 0° C. A 20 wt % aqueous solution of sodium nitrite ($NaNO_2$; 4.52 g dissolved into 30 mL water) is added slowly to the first solution while maintaining the temperature below 0° C. Concentrated HCl (19.5 mL) is slowly added dropwise over 1 hour while maintaining the internal temperature below 0° C. The mixture forms a pale brown suspension and is subsequently stirred an additional 0.5 hour.

In a separate 2-L resin kettle is dissolved 3-hydroxy-2-naphthoic acid (12.2 g) into an aqueous solution of KOH (12.0 g) in water (130 mL). An additional 350 mL of water is added, and the solution was then cooled to about 15° C. while stirring. The cold suspension of the diazonium salt solution is then added slowly to the coupling solution while mixing vigorously. The color change is immediate to a dark red solution, and ultimately to a yellowish-red (orange) slurry of precipitated dyestuff. The mixture is stirred for 2 hours while warming up to room temp, then is vacuum-filtered and reslurried into about 600 mL of deionized water. The resulting orange slurry is herein referred to as "Lithol Rubine-Potassium salt dyestuff" and has a solids content of about 3.75%-wt.

Step 2: Laking Step to Produced Nanoscale Particles of Pigment Red 57:1

Into a 1-L resin kettle equipped with mechanical stirrer and condenser is charged 265 g of aqueous slurry of "Lithol Rubine-Potassium salt dyestuff" prepared from Step 1 of Example 3, having approximately 3.75%-wt solids content. The pH of the slurry is first adjusted to about 9.0 or higher by addition of 0.5 M KOH solution, which causes complete dissolution of the dyestuff. An aqueous solution 5 wt % Dresinate X rosin-type surfactant (20.0 mL), obtained from Hercules Corp., is added to the mixture followed by the addition of a solution containing a sterically bulky surface additive, 4.8 g of sodium dioctyl sulfosuccinate obtained from Sigma-Aldrich (Milwaukee, Wis.) dissolved in 220 mL of 90:10 deionized water/THF. Lastly, an aqueous solution of calcium chloride dihydrate (0.5 M solution, 65 mL) is added dropwise to the slurry while stirring vigorously. A red precipitate forms immediately, and after complete addition of the calcium chloride solution, the red slurry is stirred for an additional 1 hour. The pigment slurry is then heated to about 60° C. for 30 min, and cooled immediately after in a cold bath. The pigment nanoparticles are then vacuum-filtered under high vacuum through a Versapor®-450 membrane filter cloth (obtained from PALL Corp., Mississauga, CANADA), then rinsed with two 200 mL portions of deionized water, until the filtrate pH is less than about 7.5 and the conductivity is lower than 200 µS/cm, so as to remove excess salts. At this stage, the wet nanopigment cake is reslurried into about 200 mL of deionized water and a portion is prepared for silica encapsulation process as described in Example 2, while the remainder is freeze-dried for 48 hours, affording a dark red-colored powder (12.75 grams). Transmission electron microscopy images of the dried nanoscale pigment powder show predominantly platelet-like particles with particle diameters ranging from 50-150 nm, and aspect ratios that were equal to or less than about 3:1.

Example 2

Silica-Encapsulation of Nanoscale Particles of Monoazo Laked Pigment

A portion of the reslurried wet nanoscale pigment PR 57:1 in deionized water, prepared as described in Example 1, is used for the silica encapsulation process. 37.7 g of the aqueous slurry of nanoscale Pigment Red 57:1 containing about 3.3 wt % solids content (about 1.2 g pigment solids, 2.83 mmol) is filtered through 0.45 µm GHP polypropylene filter membrane cloth (available from PALL Corp., Mississauga, Calif.). The pigment filtercake is then stirred briefly in 15 mL of tetrahydrofuran to remove residual surface additive of sodium dioctyl sulfosuccinate, filtered and rinsed twice with 95% ethanol. The pigment filtercake is then redispersed with mechanical stirring into 95% ethanol (300 mL), and is charged into a 3-neck round bottom flask equipped with mechanical stirrer and thermometer. To this ethanolic pigment slurry is slowly added dropwise at room temperature (using syringe pump) tetraethyl orthosilicate, TEOS (1.75 g, 8.4 mmol; available from Sigma-Aldrich, Milwaukee, USA)), while vigorously stirring at 400 rpm under a nitrogen atmosphere. The slurry is stirred for 3 more hours at room temperature, during which time some gas evaluation is produced. Using a syringe pump set at a flowrate of about 0.2 mL/min, 6.5 mL of a 50% wt/wt $NH_4OH$ solution in water is added into the pigment slurry (about 28 mmol), and the mixture is then stirred for 24 hrs under argon atmosphere. The final pH of the slurry is between 8-9. The pigment solids are recovered by filtration through GHP 0.45 μm polypropylene filter membrane cloth, and rinsed with deionized water. The wet pigment cake is redispersed into deionized water (80 mL portion) three more times and filtered, providing a bright red pigment cake and filtrate pH of about 7.0. The pigment is lastly reslurried into water for freeze-drying, to provide a final yield of 0.8 g as a red powder. TEM microscopy images of the particles showed platelets and short rod-like pigment particles with particle diameters ranging between 100 and 200 nm, and most particles had numerous surface deposits of electron-dense material consistent with silica, with the average thickness of these surface deposited material ranging from 5-15 nm. Thermal gravimetric analysis (TGA) of the dry particles, using a temperature cycle of 10° C./min heating under argon atmosphere up to 600° C., thereafter switching to hear under air (ambient) up to 900° C., indicated a residue of 40 wt % of inorganic oxides (which would predominantly be $SiO_2$ silica, among the residual oxides). Elemental analysis of the silica-encapsulated particled by ICP (Inductively Coupled Plasma) spectroscopy indicated that the sample contains 15.2 wt % Si.

Example 3

Silica-Encapsulation of Nanoscale Particles of Monoazo Laked Pigment

A portion of the reslurried wet nanoscale pigment PR 57:1 in deionized water, prepared as described in Example 1, is used for the silica encapsulation process. 36.0 g of the aqueous slurry of nanoscale Pigment Red 57:1, which contains about 1.2 g pigment solids (2.83 mmol) is treated with 1.2 mL of 10 wt % aqueous solution of poly[vinylpyrrolidone] (MW=55,000 g/mol; available from Sigma-Aldrich, Milwaukee, USA) as a primer agent to promote anchoring of the silica precursor reagent. The pigment slurry is stirred for 3 hrs at room temperature, then filtered through 0.45 μm GHP polypropylene filter membrane cloth (available from PALL Corp., Mississauga, Calif.) and rinsed with deionized water. The treated pigment cake is redispersed into 50 mL deionized water and stirred briefly at room temperature. Into the pigment slurry is added 2.5 mL of 5 wt % aqueous solution of poly(diallyldimethylammonium chloride) (PDADMAC, MW range from 100,000-200,000 g/mol; available as 20 wt % solution from Sigma-Aldrich, Milwaukee, USA) and is stirred for 1 hr at room temperature. The pigment slurry is filtered through 0.45 μm GHP polypropylene filter membrane cloth (available from PALL Corp., Mississauga, Calif.) and is redispersed into 200 mL of 95% ethanol.

The ethanolic pigment slurry is charged into a 3-neck round bottom flask equipped with thermometer and mechanical stirrer, into which is slowly added dropwise (using syringe pump) tetraethyl orthosilicate, TEOS (1.75 g, 8.4 mmol; available from Sigma-Aldrich, Milwaukee, USA), while vigorously stirring at 400 rpm under a nitrogen atmosphere. The slurry is stirred for 2 more hours at room temperature, during which time some gas evaluation is produced. About 3 mL of 1M HCl solution in water is added dropwise to the pigment slurry for the hydrolysis of TEOS, and the mixture is stirred for 1 hour at room temperature, during which time further gas evaluation is produced. Using a syringe pump set at a flowrate of about 0.2 mL/min, 6.5 mL of a 50% wt/wt $NH_4OH$ solution in water is added into the pigment slurry (about 28 mmol). If needed, the pH of the pigment slurry is adjusted to pH between 8-9 with additional 50% wt/wt $NH_4OH$ solution, added dropwise to the pigment slurry. The pigment slurry is stirred for 16 hours at room temperature, then the pigment solids are recovered by filtration through GHP 0.45 μm polypropylene filter membrane cloth, and rinsed with deionized water. The wet pigment cake is redispersed into deionized water (80 mL portion) twice more and filtered, providing a bright red pigment cake and filtrate pH of about 8.0. The pigment is lastly reslurried into water for freeze-drying, to provide a final yield of 1.1 g as a red powder. Thermal gravimetric analysis (TGA) of the dry particles, using a temperature cycle of 10° C./min heating under argon atmosphere up to 600° C., thereafter switching to hear under air (ambient) up to 900° C., indicated a residue of 52 wt % of inorganic oxides (which would predominantly be $SiO_2$ silica, among the residual oxides).

Example 4

Preparation of Nanoscale Particles of Quinacridone Pigment

In a 2 L vessel fitted with a mechanical agitator, condenser, and temperature probe, is charged 750 g of concentrated (96-98%) sulfuric acid. The agitator is started, after which is charged into the acid about 1.5 g (3 wt %) of KE-100 Pine Crystal (from Arakawa Chemical Industries), followed by addition of 50 g of Pigment Red 122 (obtained from Dainichiseika) over 30 minutes. The mixture is heated to 50° C. in 30 minutes under inert atmosphere conditions, and then kept at 50° C. for 3 hours to fully dissolve the pigment. In a separate 6 L reactor vessel equipped with mechanical agitator using a P4 stirrer blade, condenser and temperature probe is charged 1200 g de-ionized water, and then cooled to 5° C. while stirring. Once the 3 hour pigment dissolution time was completed in the 2 L reactor, the acidic solution of pigment and surface agent is added to the cooled de-ionized water very slowly over a period of 90 minutes while maintaining the temperature between 5-10° C. and under vigorous agitation, which causes reprecipitation of the pigment as nanoparticles. The quenched mixture is then neutralized by the dropwise addition of 1000 g of 26-30% aqueous ammonia solution over a period of 90 minutes, while maintaining the reaction temperature at 5-15° C. during the neutralization. The pigment is filtered and concentrated using a Crossflow filtration unit fitted with a 0.5 micron ceramic filter element. The concentrated pigment slurry undergoes repeated washing/concentration with fresh de-ionized water, using the Crossflow unit, until the filtrate pH is about 8. The concentrated pigment slurry is then transferred into a 2 L vessel equipped with mechanical agitator and temperature probe, and is stirred gently while diluting to about 300 mL of deionized water in the slurry (about 7-10 wt % pigment solids). At this stage, pigment slurry is either prepared for polymer encapsulation as described in Step 2 below, or is alternatively vacuum-oven dried at 50° C. If the latter, then the dried pigment is de-lumped in a coffee grinder, to yield about 39 g of magenta pigment. HR-TEM microscopy images show short rectangular prism-like particles having lengths of about 30-70 nm, widths of about 20-30 nm, and depths of about 15-30 nm. Typical [length:width] aspect ratios measured with these pigment nanoparticles are less than about 5, and often less than about 3. Crystal lattice d-spacings of the nanoscale pigment indicate that the beta-quinacridone polymorph of PR 122 is produced by this method.

Example 5

Silica Deposition onto Nanoscale Particles of Quinacridone Pigment

A portion of the wet pigment cake prepared in Example 5 is used for the silica surface deposition. About 14 g of the aqueous slurry of water-rinsed nanoscale PR 122 particles prepared in Example 5 having 4.3 wt % solids content (or, about 0.6 g of nanoscale pigment solids, 1.76 mmol) is treated with 0.5 mL of 5 wt % aqueous solution of sodium poly(4-styrenesulfonate), MW=70,000 available from Sigma-Aldrich (Milwaukee, USA), and the slurry is stirred for 1 hr at room temperature. The pigment is then filtered through Versapor-800 filter membrane cloth (available from Pall Corp., Mississauga, Calif.), rinsing with deionized water. The wet pigment cake is redispersed with stirring into 30 mL of deionized water and is treated with 1.5 mL of a 2 wt % aqueous solution of poly(vinyl pyrrolidinone-co-N,N-dimethylaminoethyl methacrylate), PVP-PDMEMA, MW=1×10$^6$ g/mol, available from Sigma-Aldrich (Milwaukee, USA), by slow dropwise addition over 1 hour at room temperature and under vigorous agitation. The slurry is then filtered through Versapor-800 filter membrane cloth, and the pigment filtercake is redispersed into 200 mL of 95% ethanol. To the ethanolic slurry of dispersed pigment is slowly added using syringe pump (about 0.2 mL/min flowrate) tetraethylorthosilicate (TEOS) (1.1 g, 5.28 mmol) while stirring vigorously under argon atmosphere. Following the addition of TEOS, the mixture is stirred for 3 hrs at 500 rpm at room temperature, during which time some gas evolution is produced. To the slurry is added slowly by syringe pump about 4 mL of a 50% wt/wt NH$_4$OH solution in water (about 15.8 mmol). The slurry is stirred at room temperature for 24 hrs with good agitation, giving a final slurry pH of about 9. The pigment particles are recovered by filtration through Versapor-800 filter membrane cloth, and rinsed with deionized water. The wet pigment cake is redispersed into deionized water (50 mL portion) twice more and filtered, providing a bluish-red pigment cake and final filtrate pH of about 8.0. The pigment is lastly reslurried into water for freeze-drying, to provide a final yield of 0.8 g as a bluish-red powder. Thermal gravimetric analysis (TGA) of the dry particles, using a temperature cycle of 10° C./min heating under argon atmosphere up to 600° C., thereafter switching to hear under air (ambient) up to 900° C., indicated a residue of 29.5 wt % of inorganic oxides (which would predominantly be SiO$_2$ silica, among the residual oxides).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. Core-shell nanoscale pigment particles, comprising:
a core comprised of nanoscale particles of organic pigments having a surface-associated sterically bulky stabilizer, the organic pigments having at least one functional moiety, the surface-associated sterically bulky stabilizer having at least one functional group, and wherein the functional moiety of the organic pigments associates non-covalently with the at least one functional group of the stabilizer, and
a shell layer comprised of surface-deposited silica that encapsulates the core,
wherein:
the organic pigment particles are selected from the group consisting of azo-type pigment particles, azo laked pigment particles, quinacridone pigment particles, phthalocyanine pigment particles, and mixtures thereof.

2. The core-shell nanoscale pigment particle of claim 1, wherein the organic pigment is an organic monoazo laked pigment and the at least one functional moiety is selected from the group consisting of sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, and indenones.

3. The core-shell nanoscale pigment particle of claim 1, wherein the at least one functional group of the sterically bulky stabilizer is selected from the group consisting of sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, and indenones.

4. The core-shell nanoscale pigment particle of claim 1, wherein the sterically bulky stabilizer comprises at least one aliphatic hydrocarbon moiety.

5. The core-shell nanoscale pigment particle of claim 1, wherein the sterically bulky stabilizer is selected from the group consisting of the following compounds:

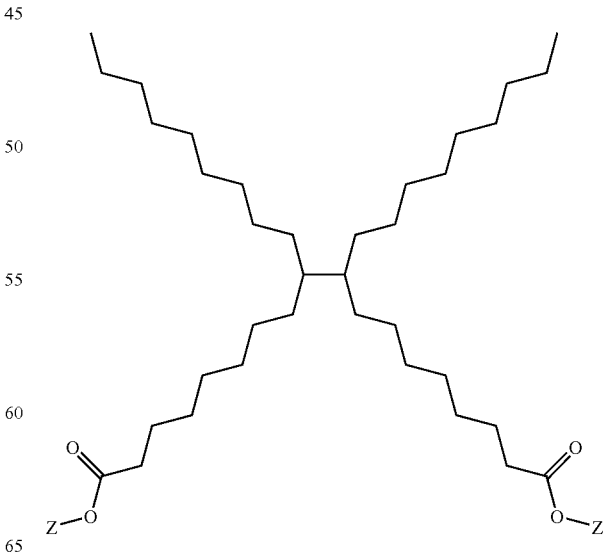

wherein Z is H, a metal cation, or an organic cation;

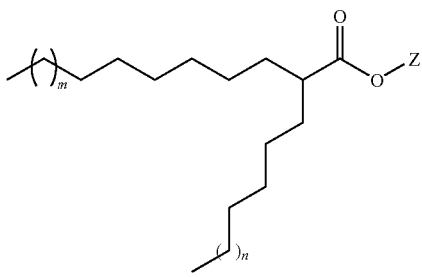

wherein Z is H, a metal cation, or an organic cation, and m+n>1;

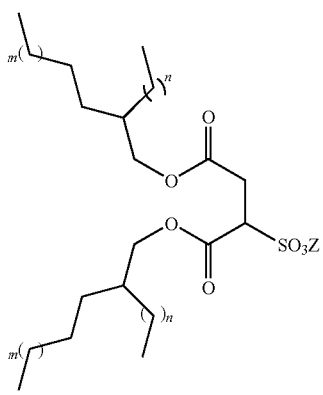

wherein Z is H, a metal cation, or an organic cation, and m+n>1 per branch;

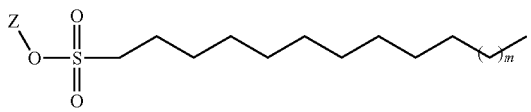

wherein Z is H, a metal cation, or an organic cation, and m≧1;

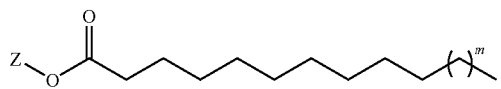

wherein Z is H, a metal cation, or an organic cation, and m≧1; and

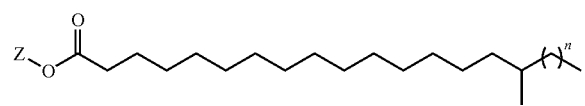

wherein Z is H, a metal cation, or an organic cation, and n≦1.

6. The core-shell nanoscale pigment particle of claim 1, wherein said organic pigment core comprises azo-type or monoazo laked pigment particles.

7. The core-shell nanoscale pigment particle of claim 1, wherein said organic pigment core comprises quinacridone pigment particles.

8. The core-shell nanoscale pigment particle of claim 1, wherein said organic pigment core comprises phthalocyanine pigment particles.

9. The core-shell nanoscale pigment particle of claim 1, wherein said silica shell has a thickness of less than about 50 nm.

10. The core-shell nanoscale pigment particle of claim 1, wherein said silica shell is prepared by a sol-gel process.

11. The core-shell nanoscale pigment particle of claim 1, wherein said silica shell comprises hydrophilic, non-functionalized silica.

12. The core-shell nanoscale pigment particle of claim 1, wherein said silica shell is functionalized with alkyl groups containing 2 or more carbons.

13. The core-shell nanoscale pigment particle of claim 1, having an average particle size, $d_{50}$, of from about 10 nm to about 250 nm, a particle size distribution having a geometric standard deviation of from about 1.1 to about 1.9, and an aspect ratio of from 1:1 to about 10:1.

14. A process for preparing core-shell nanoscale pigment particles, comprising:

preparing a core comprising nanoparticles of organic pigments having a surface associated sterically bulky stabilizer, the organic pigments having at least one functional moiety, the surface-associated sterically bulky stabilizer having at least one functional group, and wherein the functional moiety of the organic pigments associates non-covalently with the at least one functional group of the stabilizer, and encapsulating the core with a shell layer comprised of surface-deposited silica, wherein:

said organic pigment particles are selected from the group consisting of azo-type pigment particles, azo laked pigment particles, quinacridone pigment particles, phthalocyanine pigment particles, and mixtures thereof.

15. The process of claim 14, wherein said silica shell has a thickness of less than about 50 nm.

16. The process of claim 14, wherein said silica shell is prepared by a sol-gel process.

17. The process of claim 14, wherein said silica shell comprises hydrophilic, non-functionalized silica.

18. The process of claim 14, wherein said silica shell is functionalized with alkyl groups.

19. The process of claim 14, wherein the preparing of the core comprises:

providing an organic pigment or pigment precursor having the at least one functional moiety, providing a sterically bulky stabilizer compound having the at least one functional group, carrying out a chemical reaction, whereby the at least one functional moiety found on the pigment or pigment precursor is non-covalently associated with the at least one functional group of the stabilizer, so as to form the core.

20. The process of claim 14, wherein said encapsulating comprises a sol-gel polymerization comprising hydrolyzing a silica precursor agent in the presence of an alcohol solvent and optionally water, followed by condensation polymerization.

21. The process of claim 20, wherein the sol-gel polymerization is a pH-mediated polycondensation in the presence of an acid or base catalyst.

22. An ink composition comprising:
a carrier, and
a colorant comprising core-shell nanoscale pigment particles according to claim 1.

23. The ink composition of claim 22, wherein the ink composition is selected from the group consisting of solid ink compositions, phase change ink compositions, curable ink compositions, aqueous ink compositions, and non-aqueous ink compositions.

24. A toner composition comprising:
the core-shell nanoscale pigment particles of claim 1,
polymer particles, and
optionally one or more additives.

25. The core-shell nanoscale pigment particle of claim 1, wherein the surface-deposited silica is obtained from an alkoxysilane precursor reagent, wherein a molar ratio of alkoxysilane:pigment is from about 1:1 to about 10:1.

* * * * *